United States Patent [19]
Maki et al.

[11] Patent Number: 5,639,522
[45] Date of Patent: Jun. 17, 1997

[54] SIDE PROTECTIVE MOULDING FOR AUTOMOBILES

[75] Inventors: Renji Maki; Katsuyuki Amano, both of Ohbu; Takayuki Onda, Wako; Kenji Hamabe, Wako; Osamu Aoki, Wako, all of Japan

[73] Assignee: Tokai Kogyo Co., Ltd., Aichi-ken, Japan

[21] Appl. No.: 507,024

[22] Filed: Jul. 25, 1995

[30] Foreign Application Priority Data

Jul. 25, 1994 [JP] Japan .................................. 6-192319

[51] Int. Cl.$^6$ ..................................................... B32B 9/00
[52] U.S. Cl. ........................... 428/31; 428/119; 428/120; 428/136; 428/188; 428/192; 293/1; 293/128; 264/138; 264/148; 264/267; 264/171.12; 156/211; 52/208; 52/716.6
[58] Field of Search .............................. 428/31, 120, 188, 428/119, 192, 136; 156/211; 293/1, 128; 52/716, 208; 264/138, 148, 267, 171

[56] References Cited

U.S. PATENT DOCUMENTS

| | | | |
|---|---|---|---|
| 3,740,918 | 6/1973 | Meyer | 52/717 |
| 4,351,868 | 9/1982 | Otami | 428/120 |
| 4,360,549 | 11/1982 | Ozawa et al. | 428/31 |
| 4,388,355 | 6/1983 | Ikemizu | 428/31 |
| 4,397,896 | 8/1983 | Moran | 428/31 |
| 4,436,337 | 3/1984 | Bowes | 296/201 |
| 5,139,830 | 8/1992 | Gross | 428/31 |
| 5,385,703 | 1/1995 | Shanok et al. | 264/145 |
| 5,494,630 | 2/1996 | Eraybar et al. | 264/138 |

*Primary Examiner*—Patrick Ryan
*Assistant Examiner*—Abraham Bahta
*Attorney, Agent, or Firm*—Howson and Howson

[57] ABSTRACT

Disclosed is a side protective moulding having a decorative section and a rib section. The decorative section has a protruding section protruding most with respect to a door, and a curved section extending aslant from the protruding section toward the door. The rib section has a hollow section formed on the back side of the protruding section and a reinforcing leg section extending from the hollow section toward the door. The side moulding is moulded by a hollow injection moulding process. Adopting this moulding process can improve the outside appearance of the side moulding by eliminating sink marks and wrinkles from the surface of the decorative section if a thick wall section for increasing side moulding rigidity and impact strength is formed on the back side of the decorative section.

23 Claims, 33 Drawing Sheets

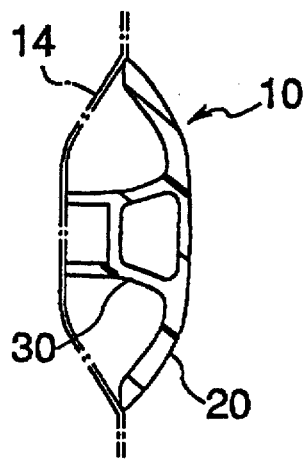

FIG. 5(a)

| Material | Min. opening speed at which impact plate gives damage to door |
|---|---|
| Modified PP (Bending modulus; 10,000 kg/cm$^2$) | At 1.40 m/sec., impact plate interfered with door, deforming side moulding |
| Modified PP (Bending modulus; 15,000 kg/cm$^2$) | At 1.40 m/sec., impact plate interfered with door, deforming side moulding |
| Modified PP (Bending modulus; 18,000 kg/cm$^2$) | At 1.44 m/sec., impact plate interfered with door, deforming side moulding |

FIG. 5(d)

| Material | Min. opening speed at which impact plate gives damage to door |
|---|---|
| ①Skin PVC (Hardness 80) ②Core SPCC (Thickness 0.4 mm) ③Inside PVC (Hardness 80) | At 1.40 m/sec., impact plate interfered with door, deforming side moulding |

| Material | Min. opening speed at which impact plate gives damage to door |
|---|---|
| Modified PP (Bending modulus; 10,000 kg/cm²; thickness 3 mm) | At 0.60 m/sec. or less, impact plate interfered with door, deforming side moulding |
| Modified PP (Bending modulus; 18,000 kg/cm² thickness 2 mm) | At 0.60 m/sec. or less, impact plate interfered with door, deforming side moulding |

| | Unit | ① | ② | ③ | ④ | ⑤ | ⑥ |
|---|---|---|---|---|---|---|---|
| Overall width of side protective moulding (D) | mm | 40 | 40 | 40 | 80 | 80 | 80 |
| Width of hollow rib section (C) | mm | 15 | 15 | 15 | 14 | 14 | 14 |
| Position of reinforcing leg section (L) | mm | 0 | 2.5 | 3.5 | 0 | 2 | 3.5 |
| Ratio between width of hollow rib section and position of reinforcing leg section (L/C) | | 0 | 5/30 | 7/30 | 0 | 1/7 | 1/4 |
| Min. opening speed at which impact plate gives damage to door (F) | m/sec | 1.48 | 1.40 | 1.31 or more | 1.49 | 1.40 | 1.28 or more |

| | Unit | ① | ② | ③ | ④ | ⑤ | ⑥ | ⑦ | ⑧ | ⑨ |
|---|---|---|---|---|---|---|---|---|---|---|
| Width of hollow rib section (C) | mm | 5 | 5 | 5 | 5 | 10 | 10 | 15 | 15 | 15 |
| Height of hollow rib section (H) | mm | 5 | 10 | 15 | 17 | 8 | 12 | 6 | 8 | 10 |
| Condition of sink mark in decorative section (Visual check)(Depth of sink mark) | μ | ※1 #1 | ※1 #1 | ※2 17 | ※3 30 | ※1 #1 | ※1 #1 | ※1 12 | ※1 #1 | ※1 #1 |

※1: Hard to visually confirm
※2: Hard to visually confirm at gross 30 or less
※3: Visually confirmable at gross 30
1: Depth of sink mark: 10 μ or less

| | Unit | ① | ② | ③ | ④ | ⑤ | ⑥ |
|---|---|---|---|---|---|---|---|
| Overall width of side protective moulding (D) | mm | 40 | 40 | 40 | 80 | 80 | 80 |
| Width of hollow rib section (C) | mm | 20 | 15 | 7 | 30 | 14 | 10 |
| Width of hollow rib section relative to overall width of side protective moulding (D/C) | | 2.0 | 2.7 | 5.7 | 2.7 | 5.7 | 8.0 |
| Min. opening speed at which impact plate gives damage to door (F) | m/sec | 1.40 | 1.52 | 1.60 or more | 1.45 | 1.55 | 1.60 or more |

SIDE PROTECTIVE MOULDING FOR AUTOMOBILES

BACKGROUND OF THE INVENTION

1. Field of the Invention

The present invention relates to a side protective moulding for automobiles (hereinafter referred to as the side moulding) for protecting an automobile body side surface, chiefly a door, from impacts in case of contact with an adjacent motor vehicle, wall, etc.

2. Description of the Related Art

The side moulding, as shown in FIG. 13, is a resin or rubber moulding mounted on the body (mainly a door 14) of an automobile 12.

The side moulding 50 must satisfy the following requirements to accomplish its purpose.

From viewpoint of function:

(1) The side moulding 50 must protrude sideward (outward) from a body 14 for the purpose of protecting the body 14 in case of accidental contact with an adjacent motor vehicle, wall, etc.

(2) The side moulding 50 must have so great a strength as to withstand a certain degree of impacts. If the side moulding 50 is deformed with impacts, the general outside appearance of the automobile will be deteriorated.

From viewpoint of decoration (outside appearance):

(3) The outside appearance of the side moulding 50 must be elegant. The side moulding 50 is a part to be installed on the outside of the automobile 12, and therefore if its surface is distorted, the general appearance of the automobile will be impaired.

From viewpoint of economics:

(4) The side moulding 50 must be of light weight and a manufacturing cost thereof must be low, which are based on the economics of manufacture demanded for the automobile 12, and on cost reduction common to every field of manufacture.

As a prior art side moulding, as shown in FIG. 5(b), there is a moulding using a metallic core of a C-shaped cross section covered with a flexible resin 54 such as non-rigid PVC etc.

This side moulding 56 is so designed as to be attached by fasteners such as clips to the body 14 of the automobile 12.

As another prior art side moulding, as shown in FIG. 5(c), there is a hollow moulding moulded of elastomer by a blow moulding process. This side moulding 58 is designed to be attached to the body 14 of the automobile 12 by the use of a double-coated adhesive tape or an adhesive.

A further another prior art moulding has a pair of ribs 62, 62 integrally formed on the back side of a protruding part 61 projecting to the side of the side moulding 60 as shown in FIG. 12.

In moulding the side moulding by an injection moulding process, generally a moulding thickness is set to about 2 to 4 mm to obtain better resin fluidity, whereby there will hardly occur a sink mark and a flow mark in the surface of the side moulding. It, therefore, is desirable that the protruding part be about 2 to 4 mm thick.

The protruding part 61 of the side moulding 60 is sometimes protruded over the thickness T of the protruding part 61 as shown in FIG. 12. In such a case, the rib 62 is integrally formed on the back side of the protruding part 61 to hold the protruding state by the rib 62. Moreover it is desirable that the protruding part 61 be apart from the body 14 of the automobile for the purpose of protection of the body. Most of the ribs 62, therefore, are comparatively long.

Furthermore, as another prior art side moulding, there is employed a flexible resin or rubber solid side moulding.

The prior art side mouldings 56 and 58 shown in FIG. 5(b) and 5(c), being off the automobile body at the back side of the most sideward protruding part and not reinforced, are liable to yield to impacts from outside. Providing that the body 14 contacts a wall etc. during travel or a door of an adjacent automobile contacts the side mouldings during parking, the side mouldings 56 and 58 will be easily deformed. If the side mouldings 56 and 58 are considerably deformed by an impact, not only the side mouldings 56 and 58 but the body 14 itself are injured.

In the meantime, increasing the thickness of the metallic core 52 and the resin 54 may be suggested for the purpose of improving their rigidity, but such a means is impractical because it will increase weight and manufacturing cost. Especially the increased thickness of resin will allow occurrence of sink marks in the Surface of the side mouldings 56 and 58 due to a difference in the rate of cooling, thereby impairing a decorating function.

The prior art side moulding 60 shown in FIG. 12 is produced by an injection moulding process. The rib 2 is a moulded portion ejected from a die, requiring a draft α for ejection. Generally, the draft is of the order of 1 to 2 degrees. The longer the rib 62, the thicker the root of the rib 62 becomes because of the draft provided. Therefore, there occurs a sink mark in the surface of the side moulding 60, resulting in impaired decorating function.

If the thickness of the rib 62 is reduced in an attempt to prevent the occurrence of a sink mark in the side moulding 60, the rib 62 will become unable to withstand an impact, failing in improving the impact strength of the side moulding 60.

Furthermore, decreasing the thickness of the rib 62 will give an adverse effect to resin fluidity, resulting in unsmooth flow of resin into the rib-moulding part of the die. The rib, therefore, is likely to be moulded in a defective shape, failing in contributing to improving the impact strength of the side moulding.

Furthermore, a pair of ribs are not mutually connected at the forward ends, and therefore if an impact is applied obliquely to the side moulding, the side moulding tends to slide laterally with respect to the automotive body 14. The ribs, therefore, can not withstand the oblique impact.

Furthermore, the prior art flexible resin or rubber solid side moulding is heavy and expensive.

SUMMARY OF THE INVENTION

In view of the above-described various disadvantages inherent in the heretofore known side protective mouldings, it is an object of the present invention to provide a side protective moulding to be attached on the side surface of an automobile body which has obviated such problems. The side protective moulding has a decorative section including a protruding part removed most from the side surface of the body and a curved section extending obliquely toward the body from the protruding part, and a rib section extending from the back side of the protruding part toward the body; the side protective moulding with the rib section moulded hollow by a hollow injection moulding process has solved the above-described problems.

An external force, if exerted to the side moulding, will act on the protruding part of the decorative section. On the back side of the protruding part, the rib section extends to the automobile body, withstanding the external force.

In the present invention, the rib section is moulded hollow by the use of the hollow injection moulding process. The rib section, if solid, can withstand the external force; however, such defects as sink marks and wrinkles are likely to occur in the surface of the decorative section in the course of moulding the side moulding by an ordinary injection moulding process. Moulding the rib section by utilizing the hollow injection moulding process can increase side moulding rigidity to thereby maintain good outside appearance of the decorative section.

The above and other objects, features and advantages of the present invention will be more apparent from the following description with reference to the accompanying drawings.

BRIEF DESCRIPTION OF THE DRAWINGS

FIGS. 5(a)–5(c) illustrate three side moldings, 5(a) being an embodiment of the invention, and 5(b) and 5(c) being prior art moldings.

FIGS. 5(d)–5(f) are tables showing the results of impact strength tests on the moldings of FIGS. 5(a)–5(c) respectively.

FIG. 6 (b) is a view showing dimensional positions of the position of the reinforcing leg section and the width of the side moulding;

FIG. 10 (b) is a view showing dimensional positions of the height and width of the rib section;

FIG. 11 (b) is a view showing dimensional positions of the widths of the side moulding and rib section;

DESCRIPTION OF THE PREFERRED EMBODIMENTS

Preferred embodiments of a side moulding according to the present invention will hereinafter be explained with reference to the accompanying drawings.

A side moulding 10 is generally attached on a door 14 of an automobile 12.

Figure 1:
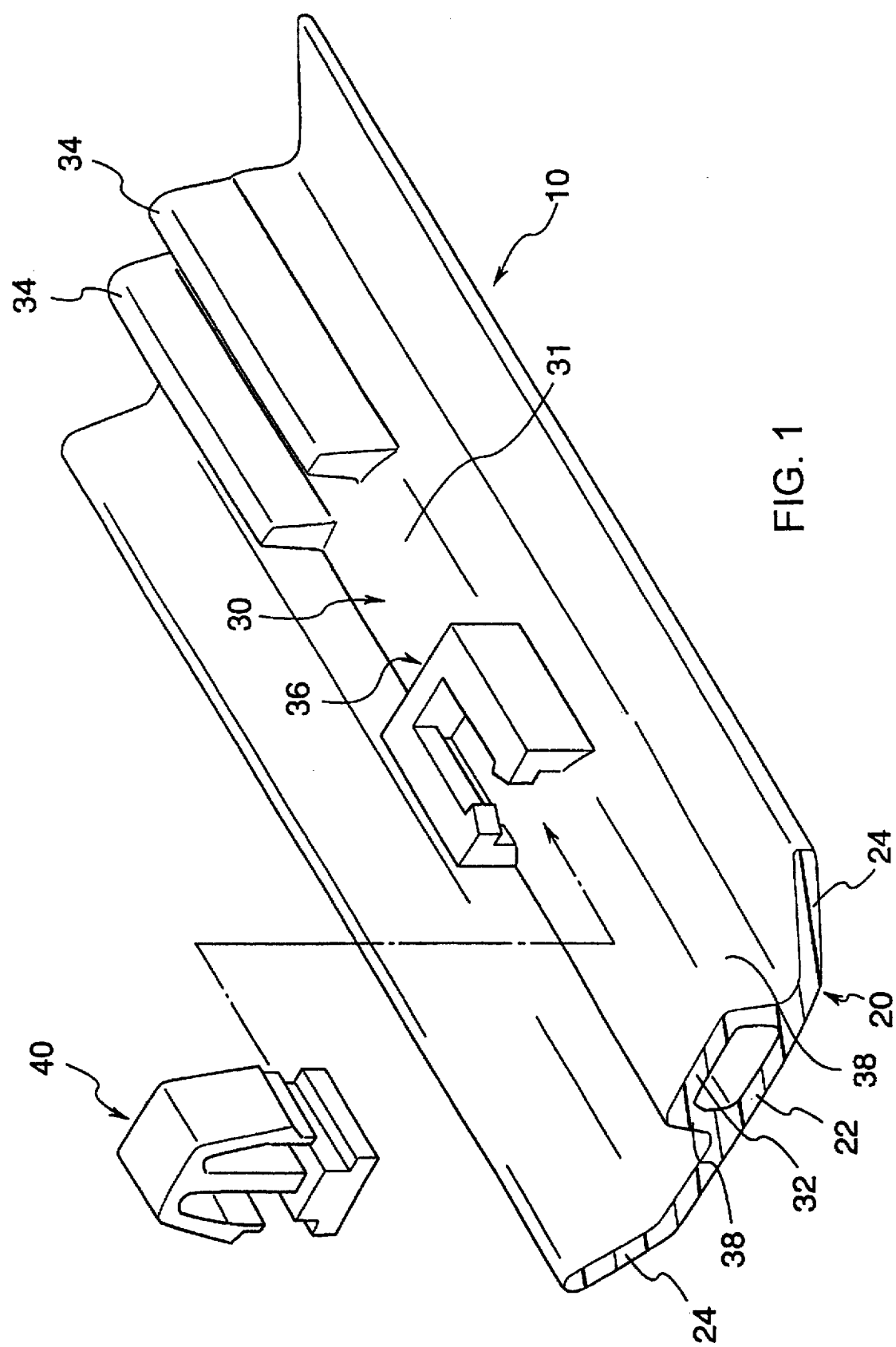
FIG. 1 is a perspective view of a side moulding according to the present invention.
Figure 2:
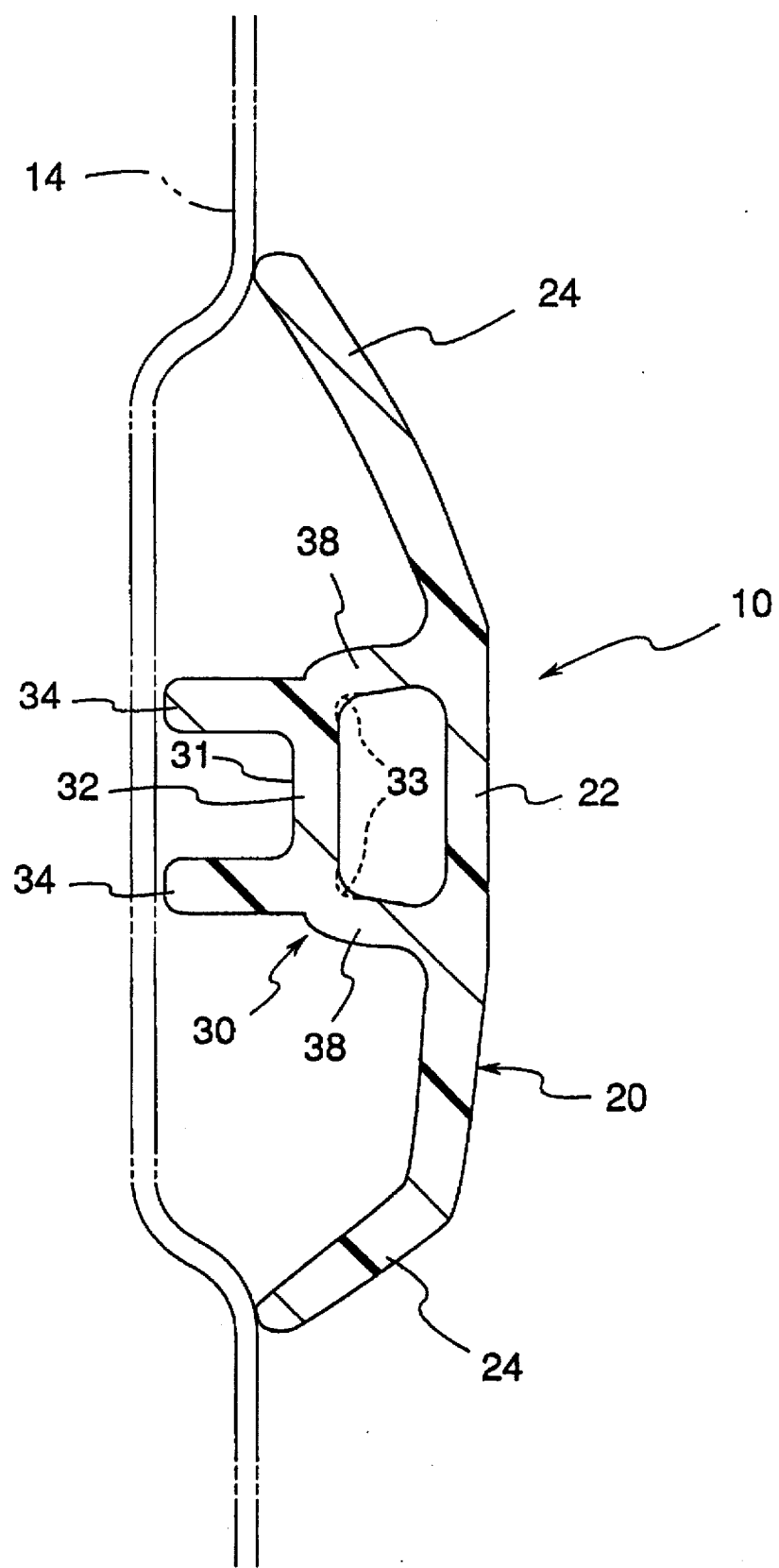
FIG. 2 is a sectional view taken in the direction of width of the side moulding of FIG. 1.

As shown in FIGS. 1 and 2, the side moulding 10 has a decorative section 20 and a rib section 30.

The decorative section 20 has a protruding section 22 protruding most with respect to the door 14, and curved sections 24, 24 extending obliquely from this protruding section toward the door.

The rib section 30 has a hollow section 32 formed on the back side of the protruding section 22, and reinforcing leg sections 34, 34 extending from this hollow section 32 toward the door 14.

The reinforcing leg section 34 is moulded in a form of ridges extending along a longitudinal side wall 38 of the hollow section 32 (along the longitudinal direction of the rib section 30) on the surface 31 of the rib section 30 facing the door 14, thereby increasing the bending rigidity and impact strength in a longitudinal direction of the side moulding 10.

The reinforcing leg section 34 has a partly unformed part, where a clip fitting section 36 is formed to hold a clip 40.

Furthermore since the reinforcing leg section 34 is formed on the side 31 facing the door 14 of the rib section 30 apart from the decorative section 20, no sink mark will occur in the surface of the decorative section 20; the side moulding 10 can be reinforced by the reinforcing leg section 34. There sometimes occur sink marks 33, 33 within the rib section 30 as indicated by a broken line in FIG. 2; the decorative function, however, will never be impaired.

The side moulding 10 is moulded by the hollow injection moulding process.

The hollow injection moulding process includes first charging a resin into a cavity of a die, and charging a high-pressure gas into the nozzle, runner and cavity of the die before all the resin in the die cavity during or after charge is cooled, thereby selectively extruding a hot molten resin with the pressure of the high-pressure gas.

Of the resin in the die cavity, the resin contacting the die surface is cooled by the die to be in a solidified or highly viscous state and therefore can not be extruded out with the pressure of the high-pressure gas. Low-viscosity resin separated from the die is extruded into a hollow state by the pressure of the high-pressure gas.

The adoption of the above-described process can eliminate sink marks and wrinkles from the surface of the decorative section 20 if the decorative section 20 has a thick wall section on the back side which increases the rigidity and impact strength of the side moulding 10. The hollow section 32 is closed at the ends, so that no rain water can enter.

The side moulding 10 of the present invention, as described above, is so constructed as to satisfy requirements for both function and decoration simultaneously.

Figure 3:
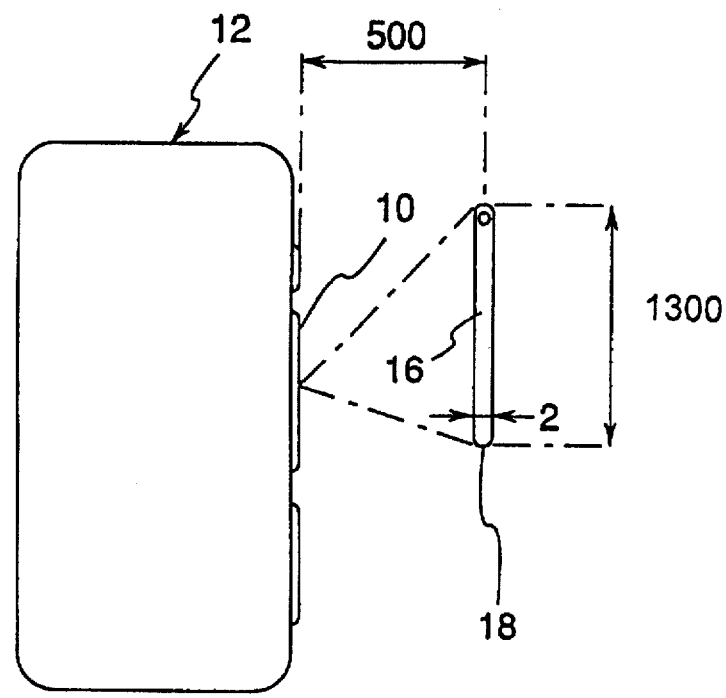
FIG. 3 is a plan view of a side moulding impact strength measuring-testing apparatus.
Figure 4:
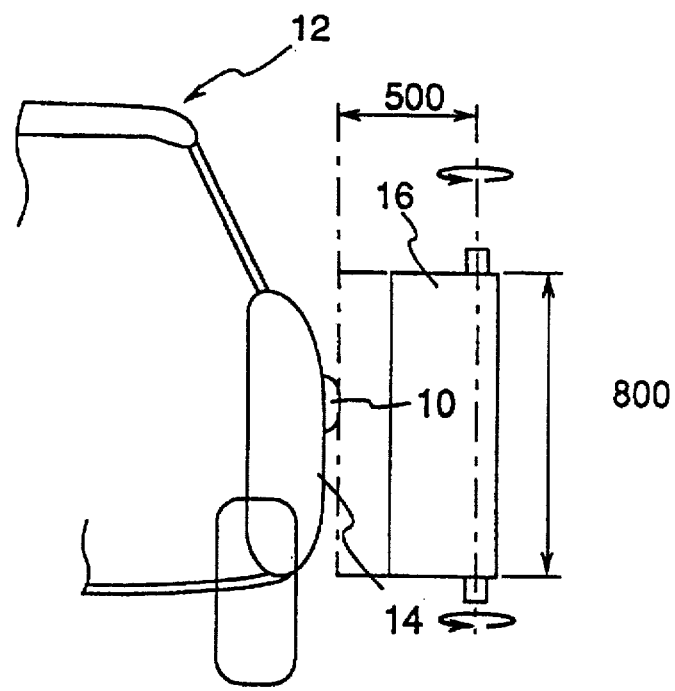
FIG. 4 is a front view of FIG. 3.

Comparisons were made of impact strength required for function between the side moulding of the present invention and a prior art side moulding. FIGS. 3 and 4 show test conditions. An iron plate 16 measuring 1300 mm long, 800 mm high and 2 mm thick is rotatably supported 500 mm apart from the door 14. The test was conducted by striking the end section 18 of this iron plate 16 against the protruding sections 22 of the side moulding 10 of the present invention and the prior art side moulding to find the minimum speed at which the door 14 was damaged by the iron plate 16.

Figures 5B, 5E:
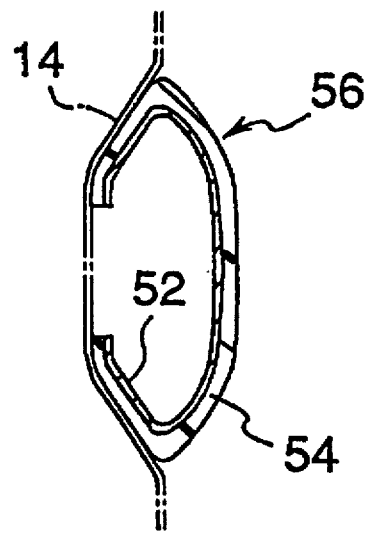
Figures 5C, 5F:
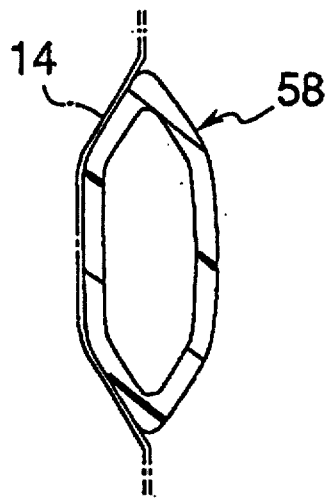

FIGS. 5(a)–(c) shows a result of tests carried out on various side mouldings. The side moulding 10 of the present invention could be confirmed to have about 1.4 to 2.3 times as great an impact strength as prior art side mouldings.

No deformation was acknowledged in the side moulding of the present invention even when the iron plate 16 was hit against the door 14.

Also, tests were carried out on the side moulding of the present invention under the test conditions shown in FIGS. 3 and 4 to see how far the moulding position of the reinforcing leg section 34 should be set apart from the edge in the direction of width of the rib section 30 in order to provide a greater impact strength. A result of these tests is shown in the table of FIG. 6 (a).

Figures 6A, 6B:
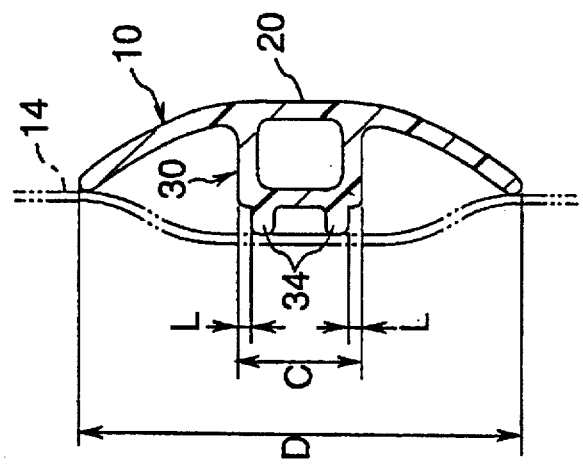
FIG. 6 (a) is a table showing a result of impact strength tests conducted with the position of a reinforcing leg section changed.

It is understood from the table of FIG. 6 (a) that the impact strength of the side moulding can be increased by setting the outer position in the direction of width of the reinforcing leg section 34 within a range of about one-quarter or less in the width C of the rib section 30 from the edge in the direction of width of the rib section 30.

Figure 7:
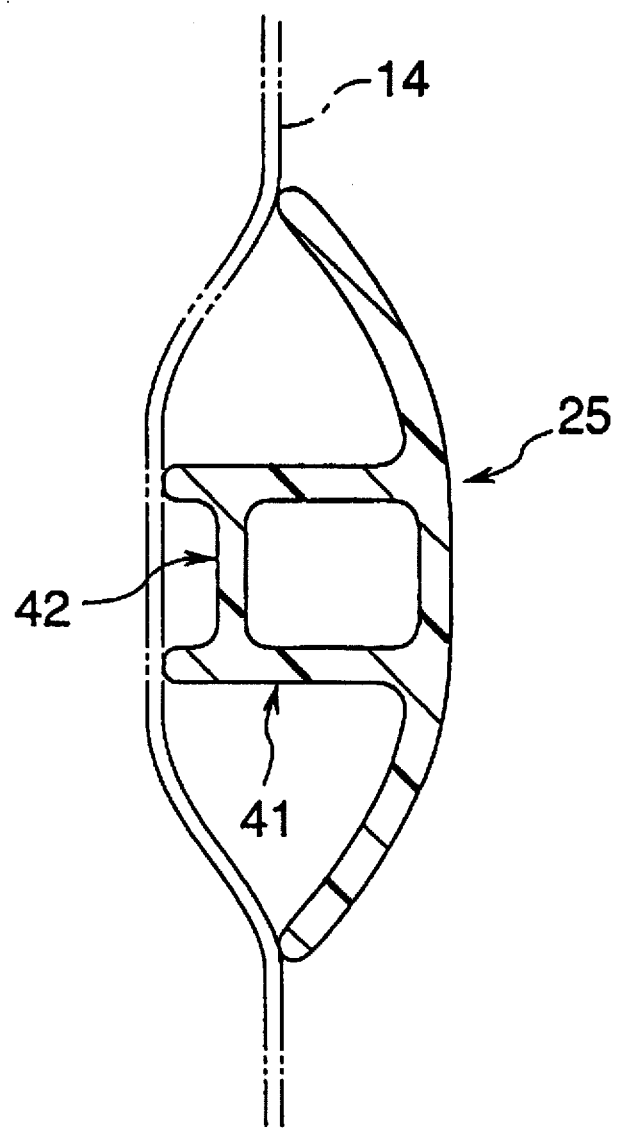
FIG. 7 is a sectional view taken in the direction of width of the side moulding with a rib section having a nearly square sectional form.

In the case of the side moulding moulded by the hollow injection moulding process described above, especially in the case of the side moulding 25 with the hollow rib section which is approximately square as shown in FIG. 7, the inside of the hollow section 42 will become almost the same in shape as the outside shape of the rib section 41, and accordingly there will occur no sink mark in the surface of the decorative section.

Figure 8:
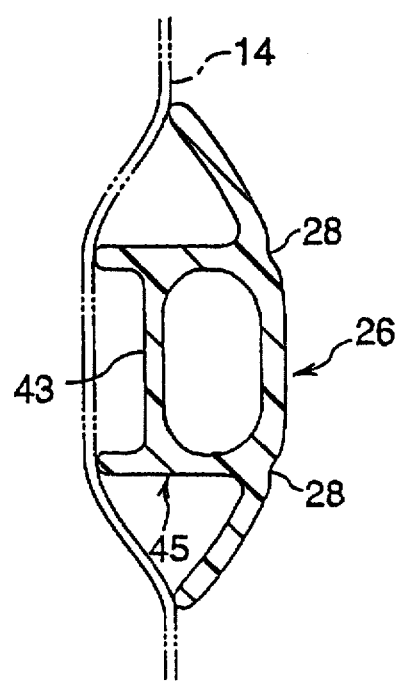
FIG. 8 is a sectional view taken in the direction of width of the side moulding with a rib section having a rectangular sectional form.
Figure 9:
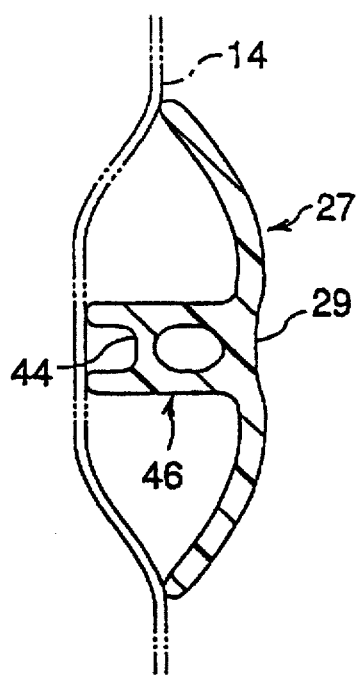
FIG. 9 is a sectional view taken in the direction of width of the side moulding with a rib section having a rectangular sectional form.

However, as shown in FIGS. 8 and 9, if the hollow sections 43 and 44 are long and slender in a rectangular form, the side moulding has a large surface area at four corners in contact with the die and cools down earlier at these corners than the long intermediate section of the rectangular form, resulting in unsmooth resin flow. In the meantime, the long intermediate section has a small surface area in contact with the die and is hard to cool; molten resin in this area, therefore, is easy to flow with the high-pressure gas. The side moulding, therefore, becomes thick in the four corners or in a short-side section and thin in the long intermediate section; when the side mouldings 26 and 27 have cooled down, sink marks 28, 28, and 29 will occur in the decorative section near the four corners or the short side.

To see in what relation between the height and width of the hollow section there will not occur sink marks in the surface of the decorative section, investigations were carried out. A result of the investigations is given in the table of FIG. 10 (a).

Figures 10A, 10B:
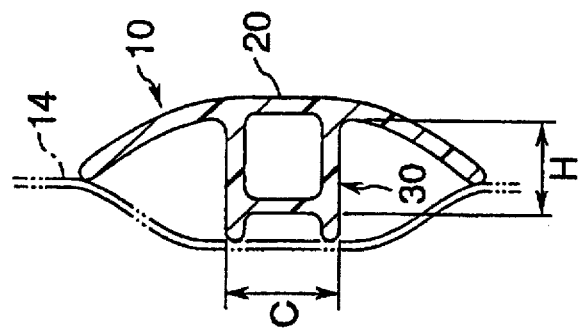
FIG. 10 (a) is a table showing the depth of sink mark occurring in the decorative section when the height and width of the rib section are changed.

It is understood from the table of FIG. 10 (a) that if the height H of the rib section 30 is set within a range of about one-third to three times as large as the width C of the rib section 30 and also within a range of about 4 mm to 15 mm as shown in FIG. 10 (b), no sink marks occur in the surface of the decorative section 20.

Figures 11A, 11B:
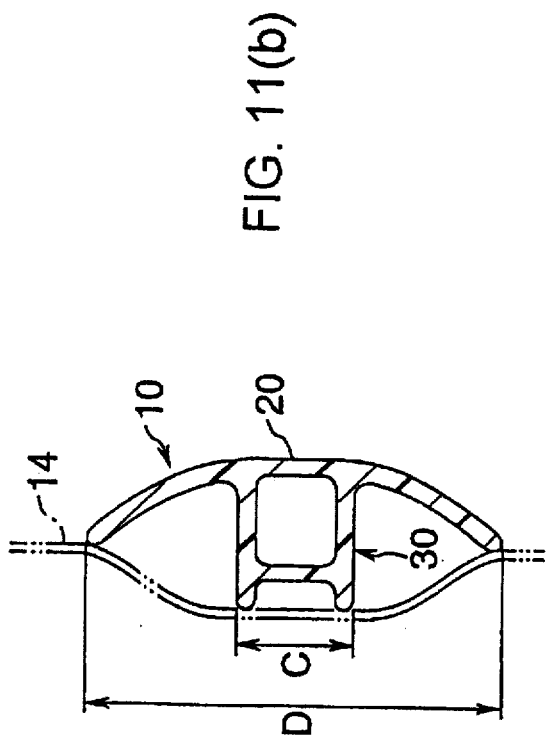
FIG. 11 (a) is a table showing a result of impact strength tests conducted with the widths of the side moulding and rib section changed.

Furthermore, tests were conducted on the basis of the test conditions shown in FIGS. 3 and 4 to see in what relation between the width C of the rib section 30 in FIG. 11 (b) and the width D of the decorative section 20 it is possible to increase the impact strength required from a viewpoint of function. A result of the tests is shown in the table of FIG. 11 (a).

From the table of FIG. 11 (a) it is understood that the impact strength of the side moulding can be increased by setting the width C of the rib section 30 within a range of about one-eighth to one-half as large as the width D of the decorative section 20, and also by setting within a range of about 5 mm to 18 mm.

Furthermore the embodiments of the present invention will be explained.

Figure 14:
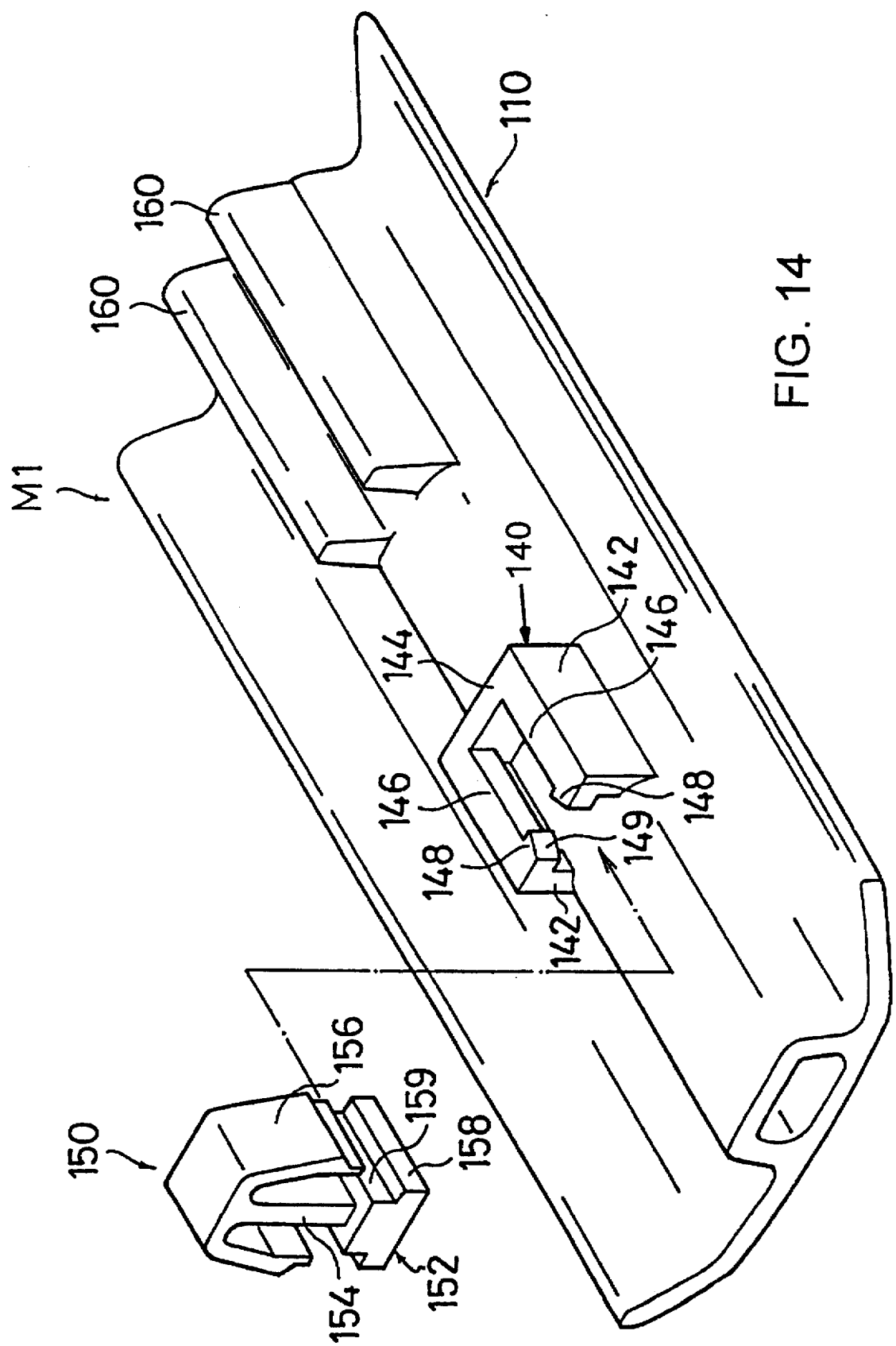
FIG. 14 is a perspective view showing a part of another embodiment of the side moulding according to the present invention.
Figure 15:
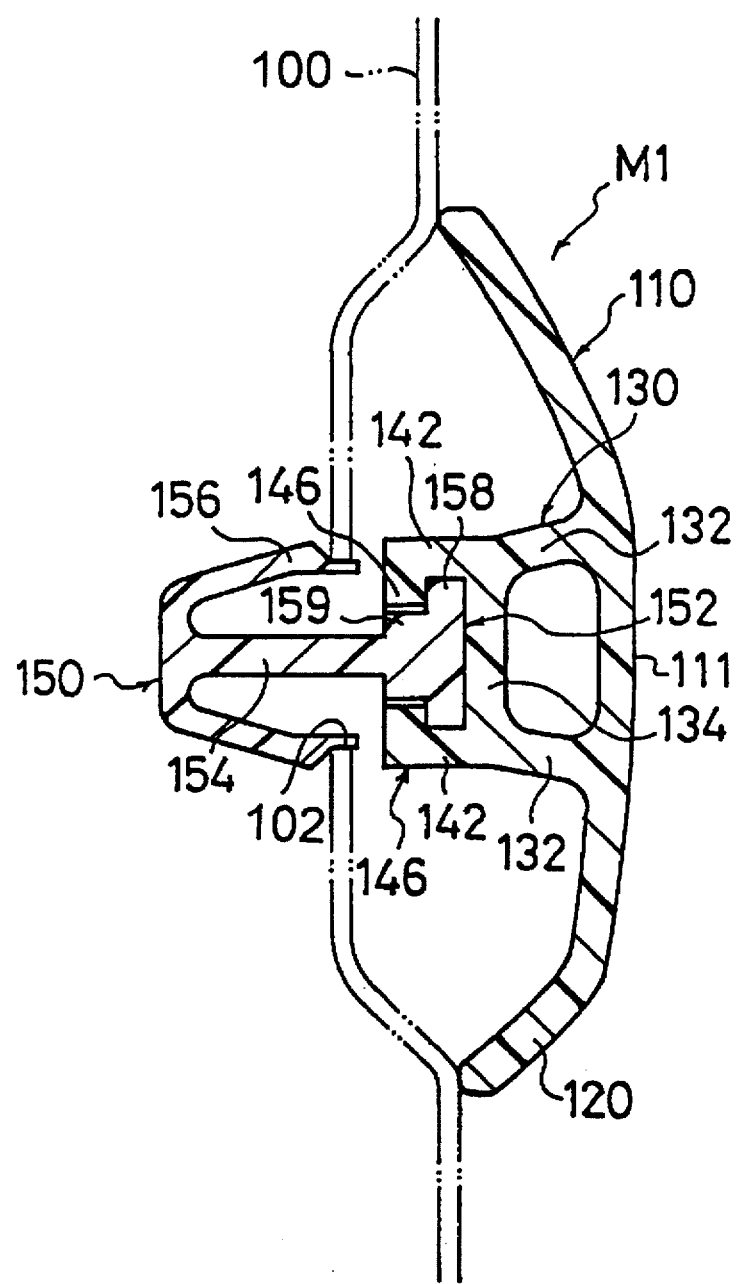
FIG. 15 is a sectional view of the side moulding of FIG. 14 including the clip holder in cross section.
Figure 16:
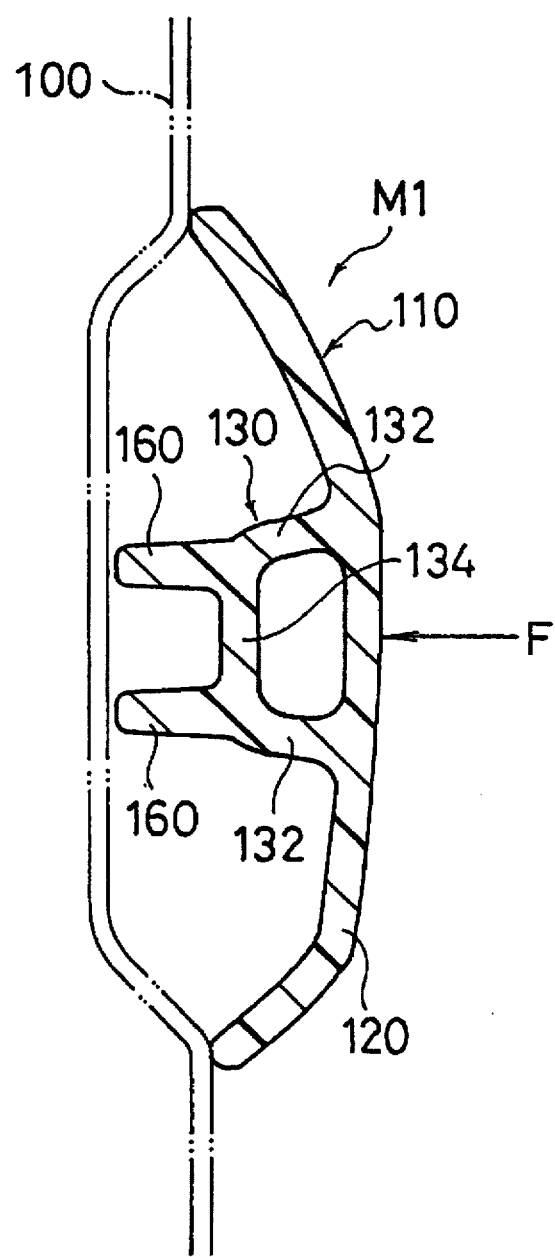
FIG. 16 is a sectional view of the side moulding of FIG. 14 including the reinforcing ribs in cross section.

FIGS. 14 to 16 show another embodiment of a side moulding M1 according to the present invention. The side moulding M1 comprises a moulding body 110 moulded by the hollow injection moulding process, and a fastener, i.e. a clip 150. Either of the moulding body 110 and the clip 150 is moulded of resin. The moulding body 110 has an approximately C-shaped cross section. The moulding body 110 has a decorative section 120, a hollow thick section 130, and a clip holder (attaching section) 140.

The hollow thick section 130 is located at center in the direction of width on the back side of the decorative section 120, partly overlapping the decorative section 120. The hollow thick section 130 is an approximately square tube formed of a pair of longitudinal side walls 132 extending nearly perpendicularly in a direction in which it goes away from the back side of the decorative section 120, and a top-face wall 134 connecting the top ends of the longitudinal side walls 132 with each other. The top-face wall 134 is formed apart from the decorative section 120 by the longitudinal side walls 132.

The clip holder 140 is formed integrally with the top-face wall 134 of the hollow thick section 130. The clip holder 140 has a pair of longitudinal side walls 142 which are parallel with each other, extending in a direction in which they goes away from the top-face wall 130, and a vertical side wall 144 connecting the ends of these longitudinal side walls 142 with each other. The longitudinal side wall 142 is open at the other end. At the upper end section of the pair of longitudinal side walls 142 is provided retaining plates 146 directed inward and at both ends on the open side of the retaining plates 146 are provided claws 148 facing each other. Each claw 148 has an oblique surface 149 at either opposite face, extending wider as it goes toward the open side.

The clip 150 is formed integrally with an engaging section 156, which is seated on a seat 152 through a connecting plate 154. The lower half section along the direction of thickness of the seat 152 is a square fixed section 158, while the upper half section forms an isosceles trapezoidal insert section 159, which gradually decreases in width as it goes toward the rear end from the insertion end.

A reference numeral 160 denotes a pair of reinforcing ribs, which are provided in an area where the clip holder 140 is not provided inside the hollow thick section 130. The reinforcing ribs 160 are provided protruding along the direction of overall thickness of the moulding body 110.

The decorative section 120, the longitudinal side wall 132 and top-face wall 134 of the hollow thick section 130, the longitudinal side wall 142 and the vertical side wall 144 of the clip holder 140, and the reinforcing ribs 160 are all approximately equal in thickness.

The moulding body 110 and the clip 150 are assembled as described below. As the seat 152 of the clip 150 is inserted at the opening of the clip holder 140, the insert section 159 of the seat 152 pushes to spread the claws 148 of the clip holder 140 sideward, elastically deforming each longitudinal side wall 142. When the rear end of the insert section 159 of the seat 152 has passed completely over the part of the claws 148, a pair of longitudinal side walls 142 that have been spread sideward by elastic deformation will recover the original form, thereby locking by the pair of claws 148 so that the seat 152 can not be released along the direction of insertion and at the same time the pair of retaining plates 146 are also locked so that the seat 152 can not be released out along the direction intersecting at right angles with the direction of insertion, thus mounting the clip 150 to the clip holder 140.

The side moulding M1 is attached to an automobile as described below. FIG. 14 shows only a part of the moulding body 110, at least at two places of which the above-described clip holder 140 is integrally formed. As shown in FIG. 15, when the engaging section 156 of the clip 150 mounted on the clip holder 140 is inserted into the engaging hole 102 provided in the body panel 100 of the automobile body, the moulding body 110 is attached horizontally by a plurality of clips 150 to the most protuberant part of the side surface of the automobile body.

Inside the central part in the direction of width of the moulding body 110, the hollow thick section 130 is formed integrally; and in the inside part of this hollow thick section 130 the clip holder 140 is formed integrally. Therefore, since the decorative section 120 and the clip holder 140 are separated by the hollow thick section 130 mounted therebetween, there will not occur sink marks, waviness, surface irregularities, etc. in the surface (decorative surface) 111 of the moulding body 110 where the clip holder 140 is provided, despite occurrence of sink marks, waviness, surface irregularities, etc. partly in the inner peripheral surface of the hollow section of the hollow thick section 130, even if the thickness of the longitudinal side wall 142 and vertical side wall 144 of the clip holder 140 is approximately equal to, or greater than, that of the moulding body 110.

The side moulding of the present invention has further the following features. The longitudinal side wall 142 of the clip holder 140 is nearly aligned with the longitudinal side wall 132 of the hollow thick section 130, and the reinforcing rib 160 is also nearly aligned with the longitudinal side wall 132 of the hollow thick section 130. Therefore, if a tensile force, compressive force or moment acts in the direction of thickness on the clip 150, the longitudinal side wall 132 of the hollow thick section 130 and the longitudinal side wall 142 of the clip holder 140 work against the force, thereby preventing deformation of the moulding body 110.

Forming the longitudinal side wall 132 of the hollow thick section 130 and the longitudinal side wall 142 of the clip holder 140 approximately at right angles with the decorative section 120 can increase the modulus of section in the direction of thickness of the moulding body 110 to thereby improve the strength of the moulding body 110 itself.

The reinforcing rib 160 serves to further improve the strength of the moulding body 110 itself. When the reinforcing rib 160 is brought close to the body panel 100 as shown in FIG. 16, the moulding body 110 becomes hard to deform if an external force F has acted on the moulding body 110, thereby enabling to increase the rigidity thereof.

Figure 17:
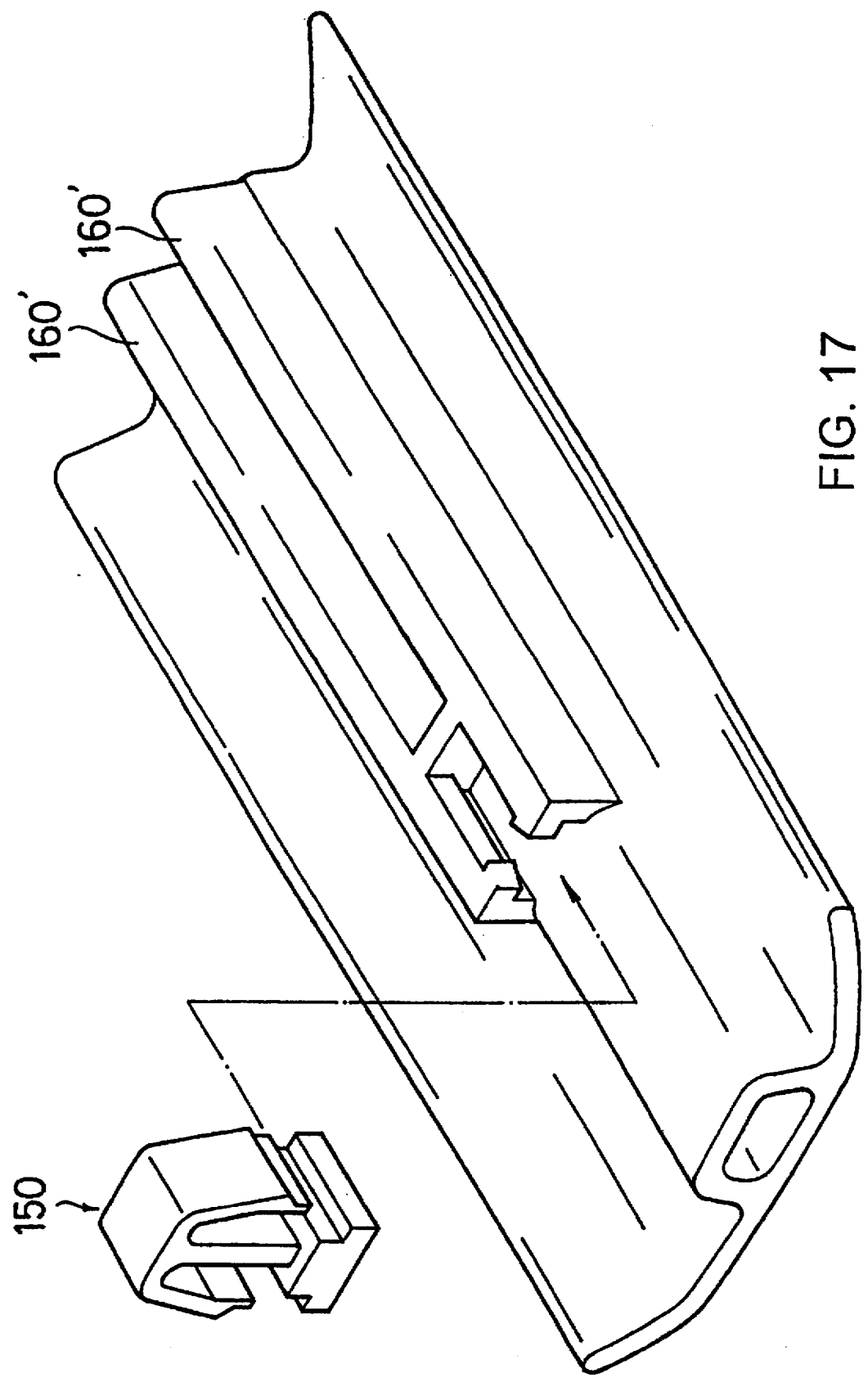
FIG. 17 is a perspective view showing a modification of a part of the side moulding of FIG. 14.

FIG. 17 shows a modification of the side moulding of the above-described embodiment. Hereinafter only a part different from the side moulding M1 of the above-described embodiment will be explained. The reinforcing rib 160' of the present embodiment extends through between adjacent clip holders. The provision of the reinforcing rib 160' through the entire length of the side moulding can improve the strength of the whole body of the side moulding while eliminating a portion which is liable to yield to bending.

Figure 18:
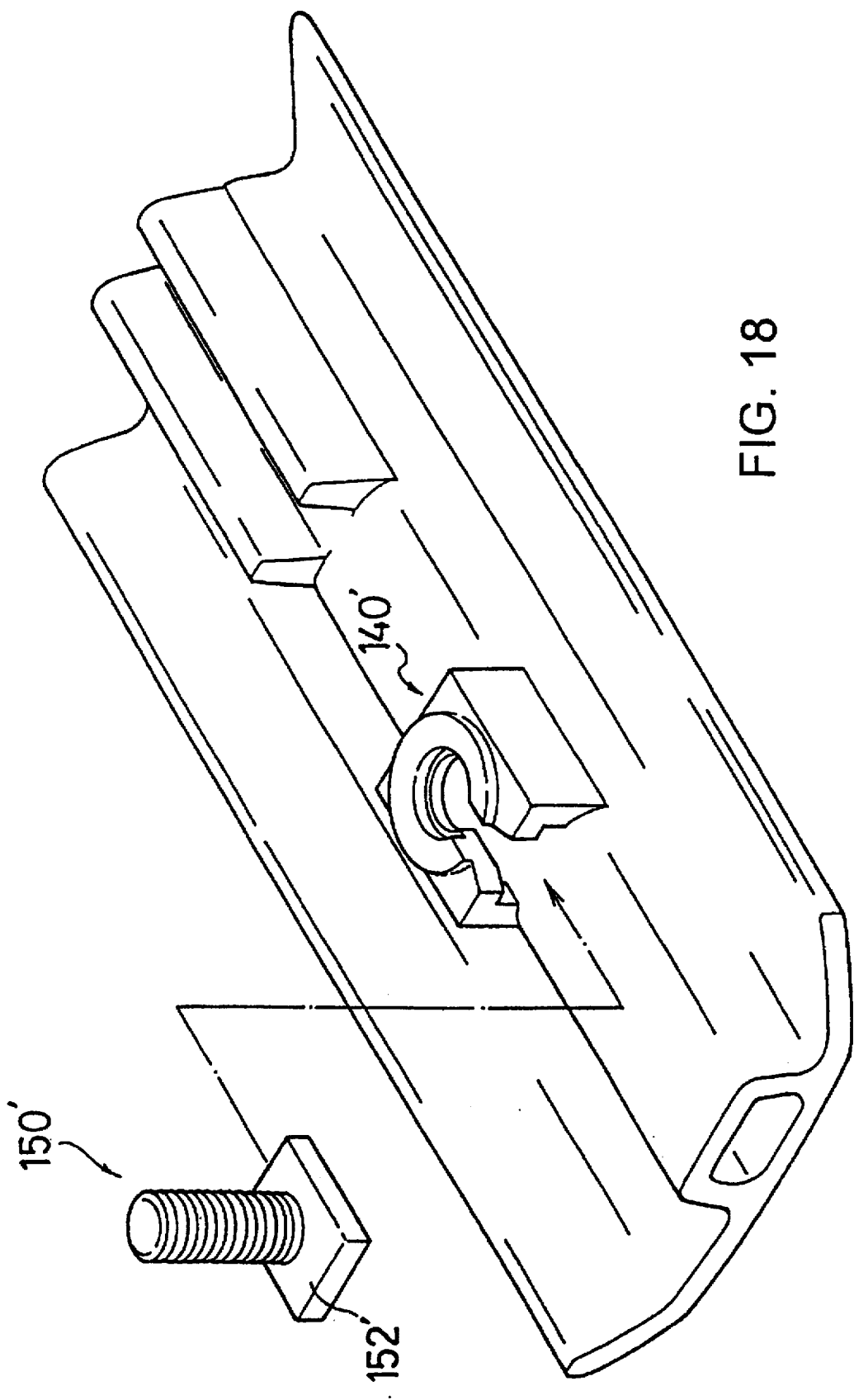
FIG. 18 is a perspective view showing a further modification of the side moulding of FIG. 14.

FIG. 18 shows further another modification of the side moulding of the above-described embodiment. Hereinafter only differences from the side moulding M1 of the embodiment described above will be explained. In the present embodiment the bolt 150' is used as a fastener. The fastening section is formed as a bolt holder 140'. The bolt holder 140' is so constituted as to hold a seating body 152' of the bolt 150'.

Figure 19:
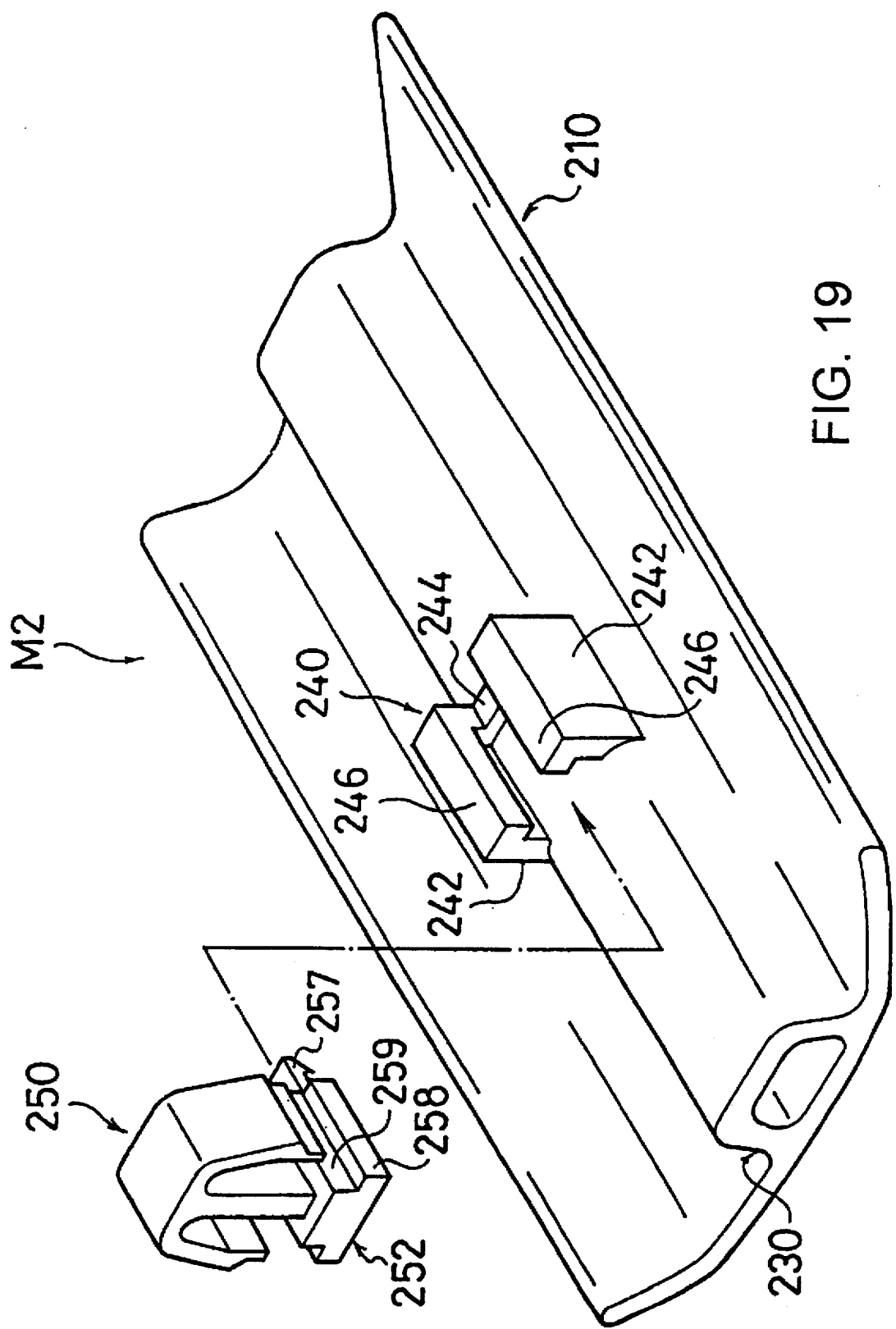
FIG. 19 is a perspective view showing a further modification of the side moulding of the present invention.
Figure 20:
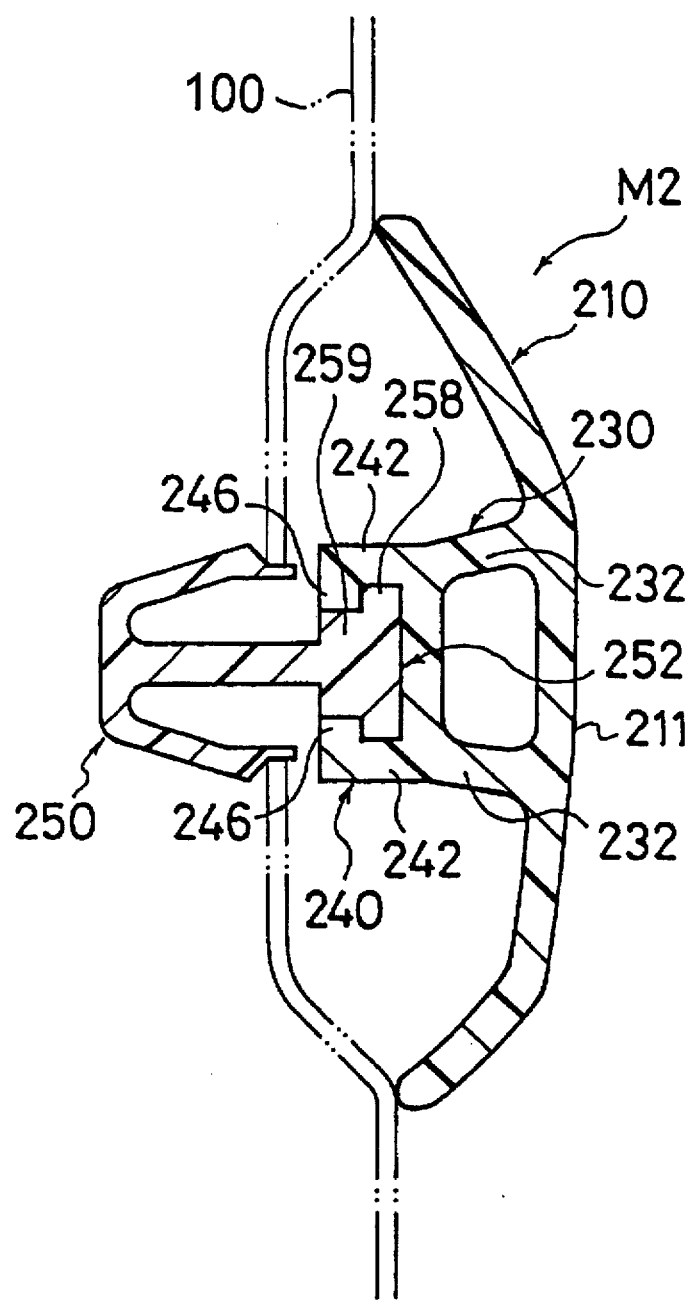
FIG. 20 is a sectional view of the side moulding of FIG. 19 including a clip holder in cross section.

FIGS. 19 and 20 show a side moulding M2 of further another embodiment according to the present invention. Hereinafter only differences from the side moulding M1 of the above-described embodiment will be explained.

A clip holder 240 formed integrally with a hollow thick section 230 of a moulding body 210 has approximately the same width as the hollow thick section 230, and is provided with a pair of longitudinal side walls 242 which face each other. At the upper end section are formed retaining plates 246, which are directed inward. Into one opening of the longitudinal side walls 242 the clip 250 is inserted; and at the other opening of the longitudinal side walls 242 an engaging section 244 is provided. The clip holder 240 is also disposed between the inside of the hollow thick section 230 and the body panel 100 on which the moulding body 210 is mounted.

In the meantime, the clip 250 is so shaped as to fit in the clip holder 240; in a seating body 252 thereof a wide section, that is, a fixed section, to be inserted between the longitudinal side walls 242 of the clip holder 240, and a narrow section, that is, an insert section 259, to be inserted between the retaining plates 246, are divided into two in the direction of thickness. Moreover, on one end along the direction of insertion of the seating body 252 is provided a retaining claw 257 which is engaged with the engaging section 244. Into the opening on the insertion side of the clip holder 240 the clip 250 is inserted with the engaging claw 257 engaged with the engaging section 244 of the clip holder 240. Thus the clip 250 is installed in the clip holder 240 in such a manner that it can not be released along both the direction of insertion of the clip 250 and a direction meeting at right angles with the direction of insertion.

In the present embodiment also, the thickness of the longitudinal side wall 242 which forms the clip holder 240 is much the same in thickness as the moulding body 210; that is, the presence of the hollow thick section 230 can prevent occurrence of sink marks, wariness, surface irregularities, etc. in a part of the surface (decorative surface) 211 of the moulding body 210 where the clip holder 240 is provided. The longitudinal side wall 242 of the clip holder 240 is aligned with the longitudinal side wall 242 of the hollow thick section 230 in the direction of thickness of the moulding body 210. Therefore if a tensile force, compressive force or moment acts in the direction of thickness on the clip 250, the longitudinal side wall 232 of the hollow thick section 230 and the longitudinal side wall 242 of the clip holder 240 cooperatively resist the force, thus preventing deformation of the moulding body 210.

Figure 21:
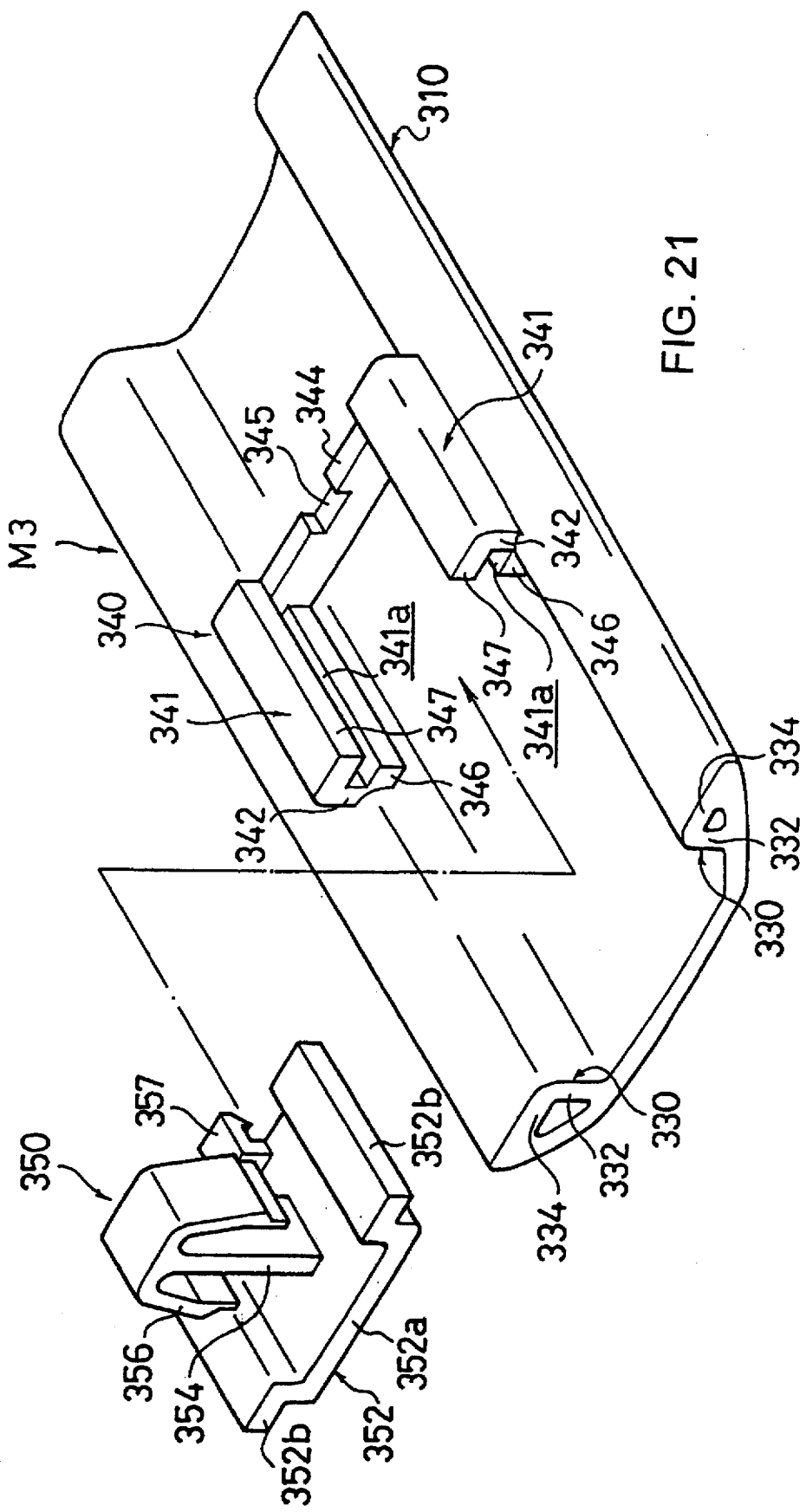
FIG. 21 is a perspective view showing a part of another embodiment of the side moulding according to the present invention.
Figure 22:
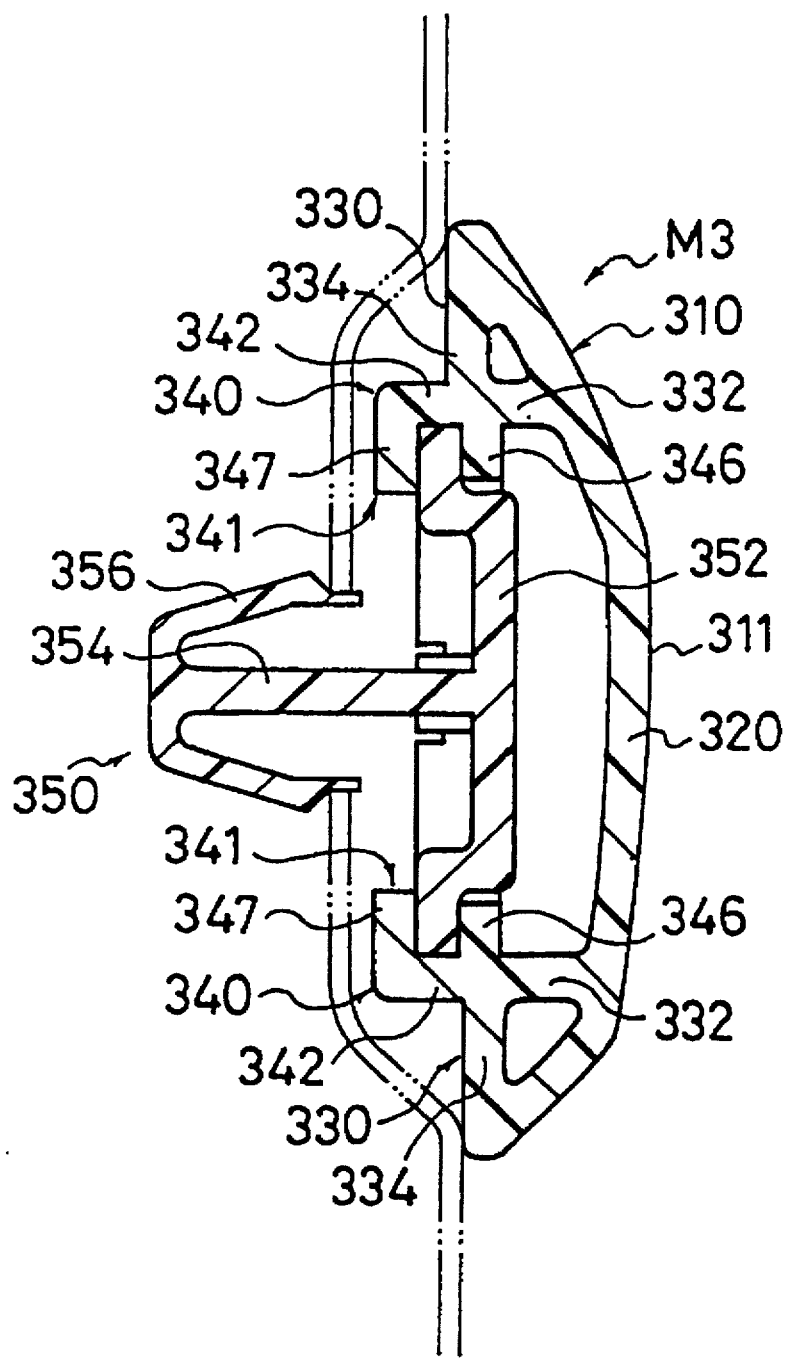
FIG. 22 is a sectional view of the side moulding of FIG. 21 including the clip holder in cross section.

FIGS. 21 and 22 show a side moulding M3 of further another embodiment according to the present invention. The side moulding M3 comprises a moulding body 310 moulded by the hollow injection moulding process and a fastener, i.e. a clip 350. The moulding body 310 and the clip 350 are either produced of resin. The moulding body 310 has an approximately C-cross section and includes a decorative section 320, a pair of hollow thick sections 330, and a fastening section, i.e. a clip holder 340.

The hollow thick sections 330 are located on both ends in the direction of width on the back side of the decorative section 320, partly overlapped with the decorative section 320. The hollow thick section 330 is a nearly triangular cylinder, which is formed of a pair of longitudinal side walls 332 extending approximately at right angles with the direction in which they go away from the back side of the decorative section 320, and a pair of back walls 334 connecting the forward end of the longitudinal side wall 332 with the edge of the decorative section 320.

The clip holder 340 is formed integrally with the hollow thick section 330 at each corner section of the hollow thick section 330, that is, at a joint section between the longitudinal side wall 332 and the back wall 334. The clip holder 340 comprises C-section guide sections 341 each having the longitudinal side wall 342 aligned with the longitudinal side wall 332 of the hollow thick section 330 and upper and lower projecting pieces 346 and 347 which face each other, and an engaging section 344 mounted in the direction of width of the moulding body 310 at one end section of the pair of guide sections 341. The insert guide section 341 forming the clip holder 340 is nearly equal in thickness to the moulding body 310, thus increasing the strength thereof.

A seating plate 352 of the clip 350 is of such a constitution that both ends in the direction of width of a body plate section 352a are slightly raised, where an insert plate section 352b is provided facing outward; at the center of the body plate section 352a an engaging section 356 is integrally mounted through a connecting plate 354; and an engaging claw 357 is provided at one end along the direction of insertion of the body plate section 352a. Then, each insert plate section 352b of the clip 350 is inserted into the groove 341a of the insert guide section 341 of the clip holder 340, and the engaging claw 357 of the clip 350 is engaged with the engaging section 345 of the clip holder 340, whereby the clip 350 becomes unreleasable along both the direction of insertion of the clip 350 and the direction which meets at right angles with the direction of insertion, thereby securely mounting the clip 350 to the clip holder 340.

Since the clip holder 340 having approximately same thickness as the moulding body 310 is located apart from the decorative section 320 of the moulding body 310, and the hollow thick section 330 integrally moulded exists inside both end sections in the direction of width of the moulding body 310, there will never occur sink marks, waviness, surface irregularities, etc. in the part of the surface (decorative surface) 311 of the moulding body 310 where the clip holder 340 is formed, notwithstanding moulding the clip holder 340 integrally with the moulding body 310.

The longitudinal side wall 342 of the clip holder 340 is nearly aligned with the longitudinal side wall 332 of the hollow thick section 330. Therefore if the clip 350 receives a tensile force, compressive force or moment in the direction of thickness, the longitudinal side wall 332 of the hollow thick section 330 and the longitudinal side wall 342 of the clip holder 340 cooperatively resist the force to thereby prevent deformation of the moulding body 310.

Figure 23:
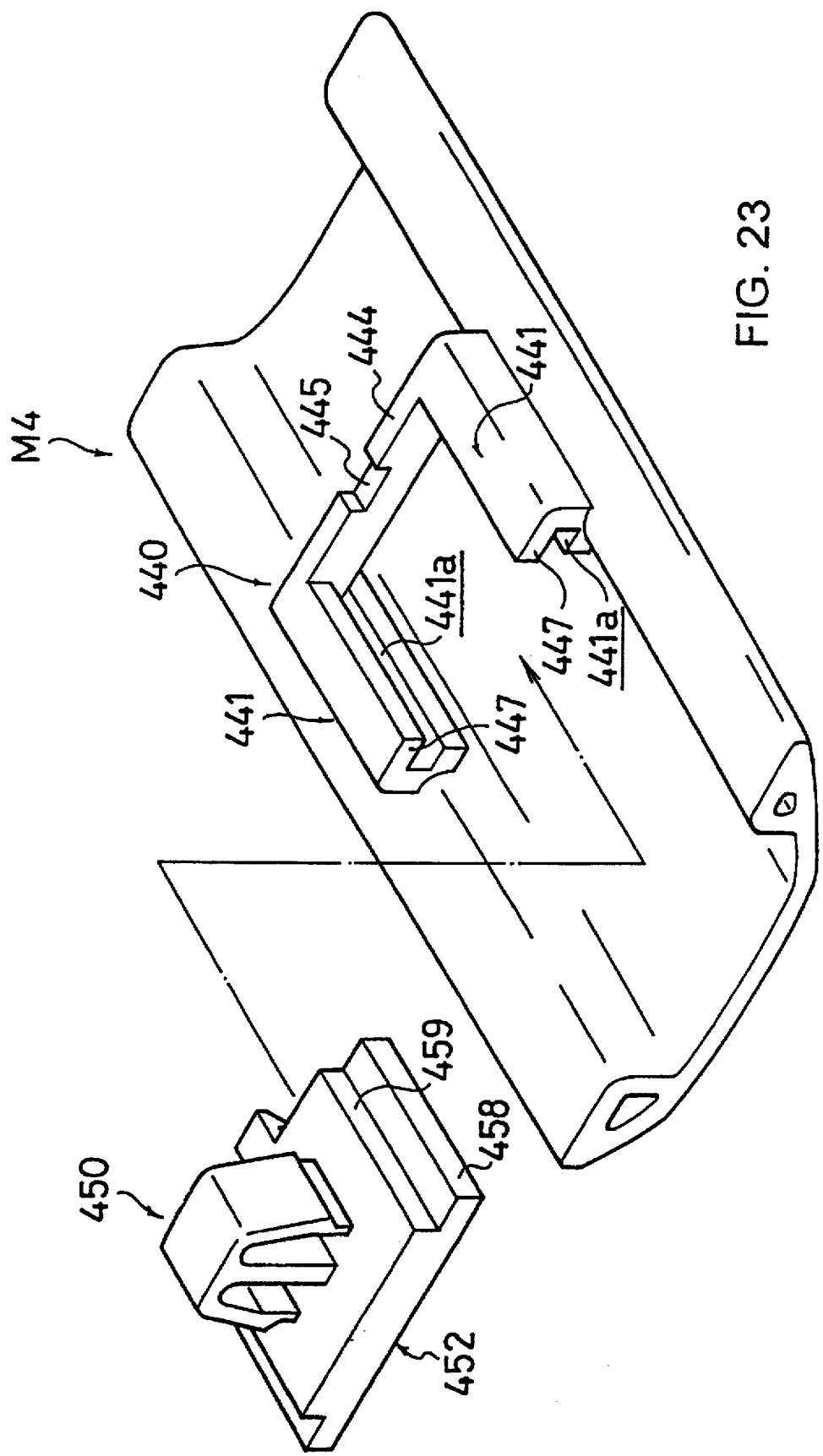
FIG. 23 is a perspective view showing a part of another embodiment of the side moulding according to the present invention.
Figure 24:
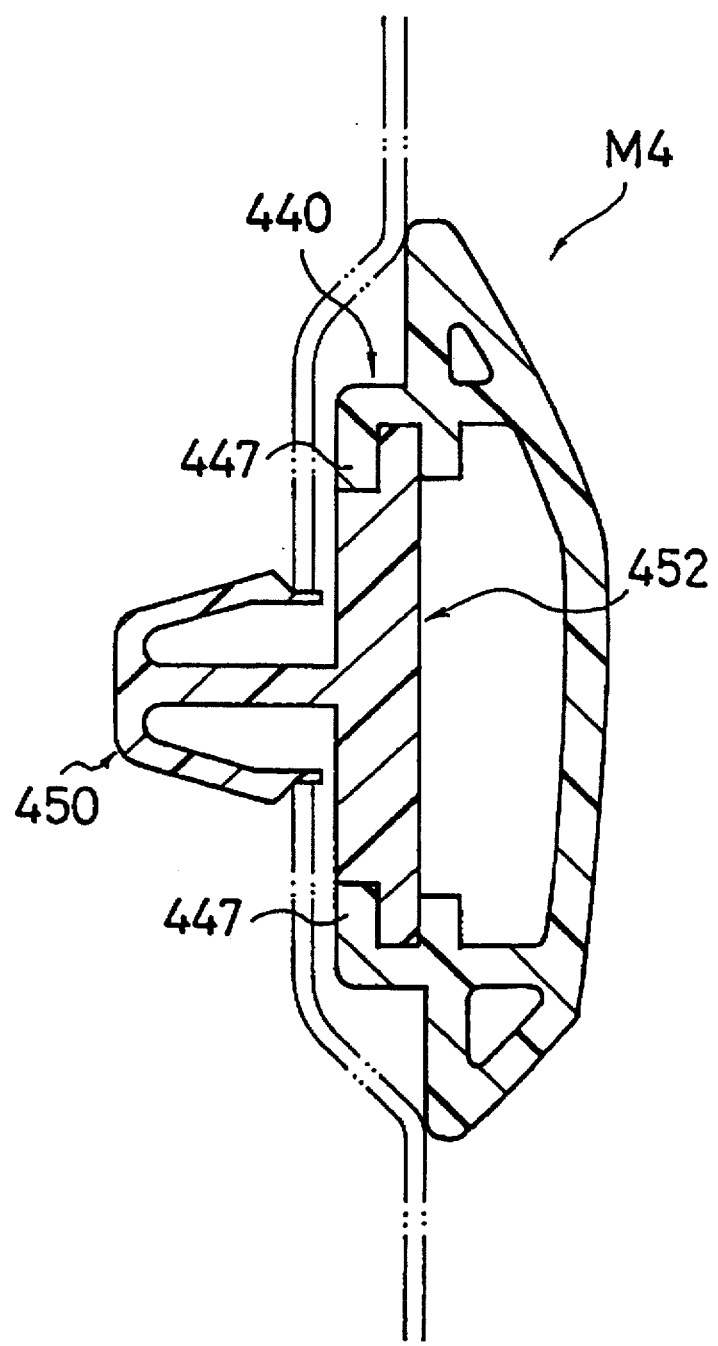
FIG. 24 is a sectional view of the side moulding of FIG. 23 including the clip holder in cross section.

FIGS. 23 and 24 show a side moulding M4 of further another embodiment of the present invention. The side moulding M4 of the present embodiment differs from the side moulding M3 of the third embodiment only in the shape of an engaging section 444 of a clip holder 440 and the shape of a seating body 452 of a clip 450. Other portions of the clip holder 440 and the clip 450 are identical in constitution to the side moulding M3 of the third embodiment.

The engaging section 444 of the clip holder 440 is flush with protruding pieces 447. On the upper surface thereof is provided an engaging section 445. The seating body 452 of the clip 450 has a wide section, i.e. a fixing section 458, along the direction of thickness, and a narrow section, i.e. an insert section 459, which are moulded in one unit. Either end of this fixing section 458 is inserted in a groove 441a of each guide section 441 of the clip holder 440, and at the same time the insert section 459 is inserted between the inner end faces of the guide sections 441.

Figure 25:
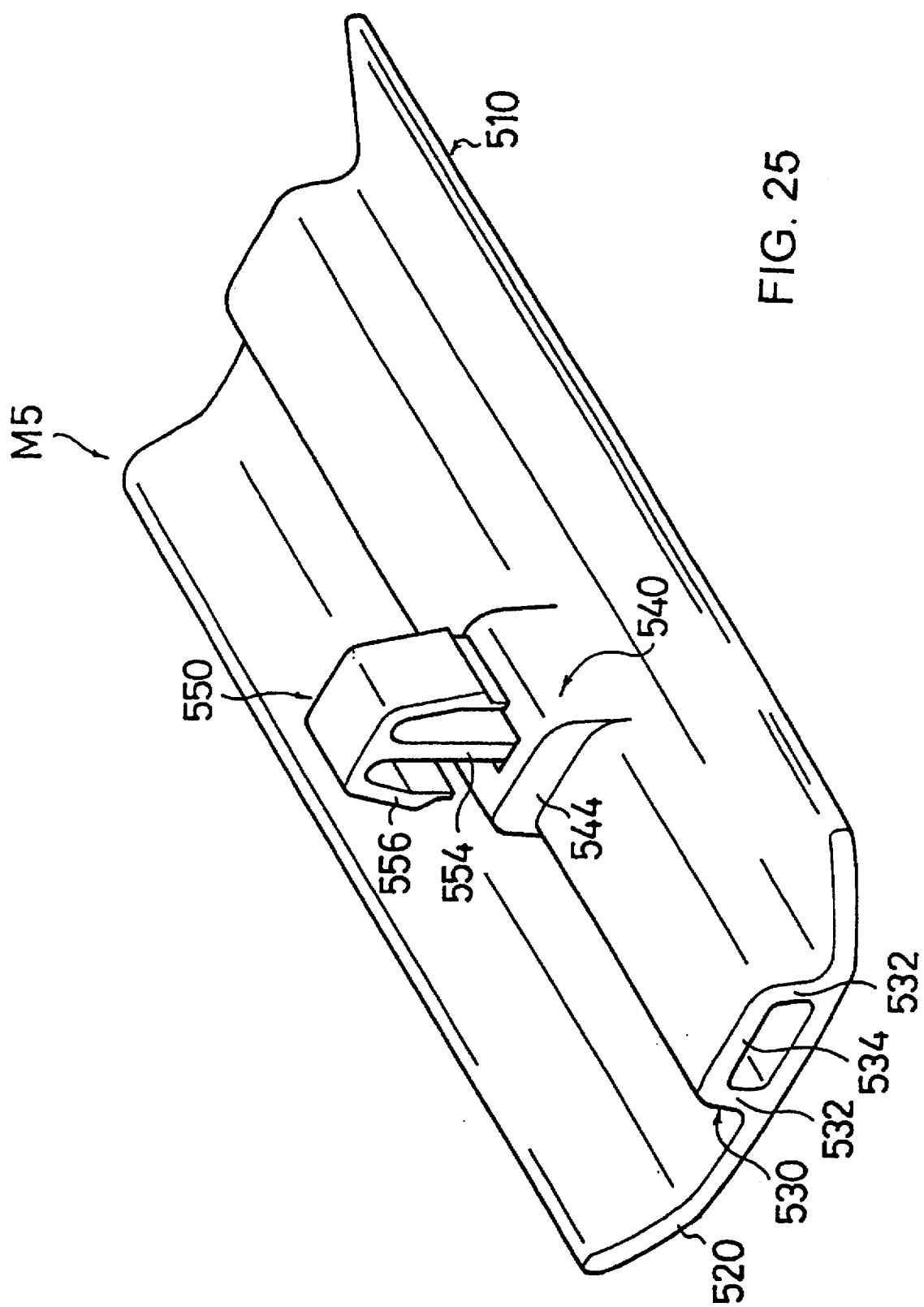
FIG. 25 is a perspective view showing a part of another embodiment of the side moulding according to the present invention.
Figure 26:
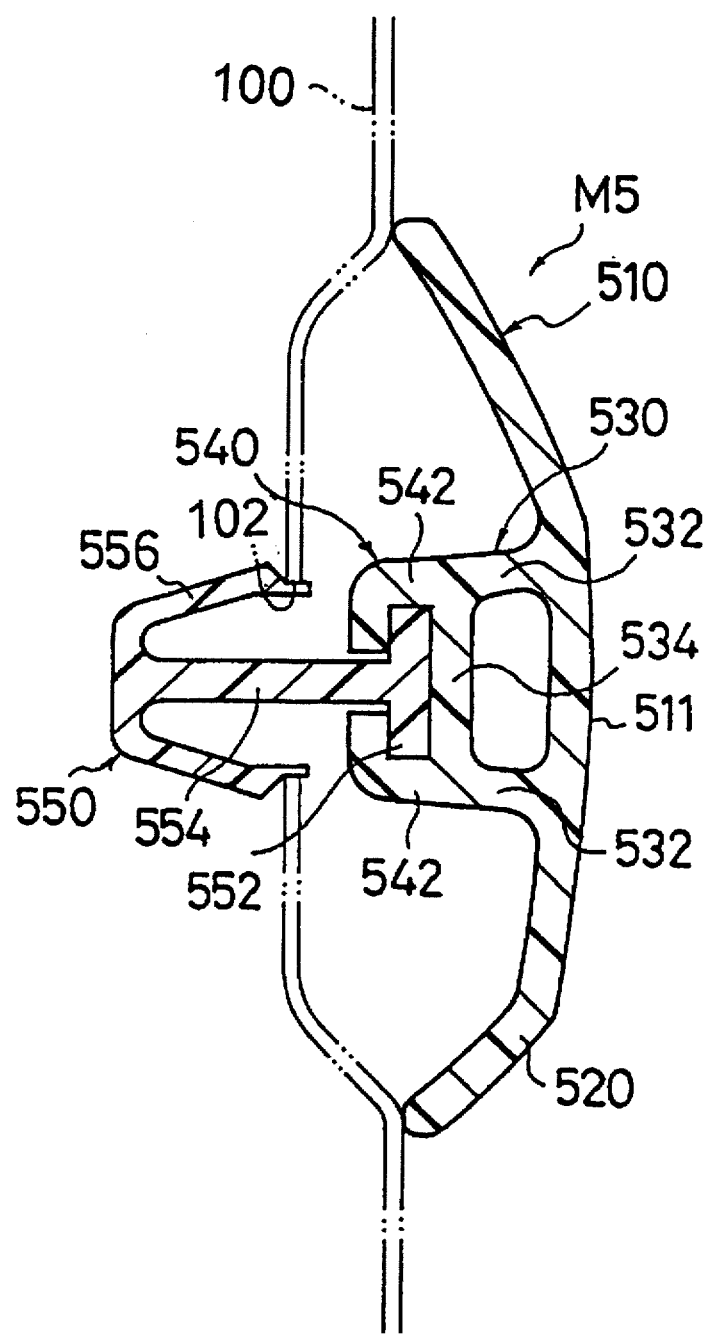
FIG. 26 is a sectional view of the side moulding of FIG. 25 including the clip holder in cross section.

FIGS. 25 and 26 show a side moulding M5 of further another embodiment according to the present invention. The side moulding M5 comprises a moulding body 510 moulded by the hollow injection moulding process, and a fastener, i.e. a clip 550, .which is moulded integrally with the moulding body 510. The moulding body 510 and the clip 550 are both moulded of resin. The moulding body 510 has an approximately C-shaped cross section, and is provided with a decorative section 520, a hollow thick section 530, and a fastening section, i.e. a partly thick section 540.

The hollow thick section 530 is located at center in the direction of width on the back side of the decorative section 520, and is partly overlapped with the decorative section 520. This hollow thick section 530 is a nearly square cylinder, which is formed of a pair of longitudinal side walls 532 extending nearly at right angles with the direction in which the longitudinal side walls 532 go away from the back side of the decorative section 520, and a top-face wall 534 which connects the forward ends of the longitudinal side walls 532 with each other. The top-face wall 534 is kept apart from the decorative section 520 by the longitudinal side walls 532.

The partly thick section 540 is formed integrally with the hollow thick section 530, and has a pair of mutually parallel longitudinal side walls 542 extending in a direction in which they go away from the top-face wall 534, and a pair of mutually parallel vertical side walls 544 extending in a direction in which they go away from the top-face wall 534. The longitudinal side wall 542 of the partly thick section 540 is formed in line with the longitudinal side wall 532 of the hollow thick section 530.

The clip 550 is of such a constitution that an engaging section 556 is formed integral with a seating section 552 through a connecting section 554. In the process of hollow injection moulding of the moulding body 510, the clip 550 is set in a die with the seating section 552 embedded in the partly thick section 540 inside the hollow thick section 530, thus forming the clip 550 with the moulding body 510 as one unit.

FIG. 25 shows only a part of the moulding body 510. At least at two places of the moulding body 510 the clip 550 is integrally attached; when the engaging section 556 of the clip 550 is inserted for engagement with the engaging hole 102 provided in the body panel 10 of the automotive body as shown in FIG. 26, the clip 550 is disposed between the inside of the hollow thick section 530 moulded integrally with the moulding body 510 and the body panel 100 on which the moulding body 510 is attached. Thus the moulding body 510 is horizontally attached by a plurality of clips 550 to the most protuberant portion of the side surface of the automotive body.

As heretofore explained, the partly thick section 540 is provided inside of the hollow thick section 530 of the moulding body 510, and in this partly thick section 540 is embedded the seating section 552 of the clip 550. If the provision of this partly thick section 540 delays cooling the molten resin in this part than in other parts, which consequently causes such defects as sink marks, waviness, surface irregularities, etc. to occur in the inner peripheral surface of the hollow area of the hollow thick section 530, there will not occur sink marks, waviness, surface irregularities, etc. in the part corresponding to the surface (decorative surface) 511 of the moulding body 510 where the clip 550 is attached, because of the presence of the hollow thick section 530. Furthermore, if the partly thick section 540 integrally moulded inside the hollow thick section 530 is increased in thickness, no sink marks, waviness, surface irregularities, etc. will not occur in the surface (decorative surface) 511 of the moulding body 510. Therefore, provided that the thickness of the partly thick section 540 is increased, the mounting strength of the clip 550 with respect to the moulding body 510 can be increased.

The side moulding M5 of the present embodiment, like the above-described embodiments, is substantially the same in thickness in the whole part. It is therefore apparent that, because the longitudinal side wall 532 of the hollow thick section 530 is approximately aligned with the longitudinal side wall 542 of the partly thick section 540, the side moulding M5 can resist a tensile force, compressive force or moment exerted to the clip 550 in the direction of thickness.

It should be noticed that in the present embodiment also, though not shown in the drawing, a reinforcing rib can be provided as in FIG. 14 or 17. The reinforcing rib improves the strength of the moulding body 510. The moulding body 510 provided with this reinforcing rib not only between adjacent partly thick sections 540 but through the entire length of the moulding body 510 can withstand a shearing force and a moment acting in a longitudinal direction. Also, the strength of the partly thick section 540 can be increased by moulding the reinforcing ribs integrally with the partly thick section 540. Similarly, in other embodiments, it is possible to provide the reinforcing ribs.

Figure 27:
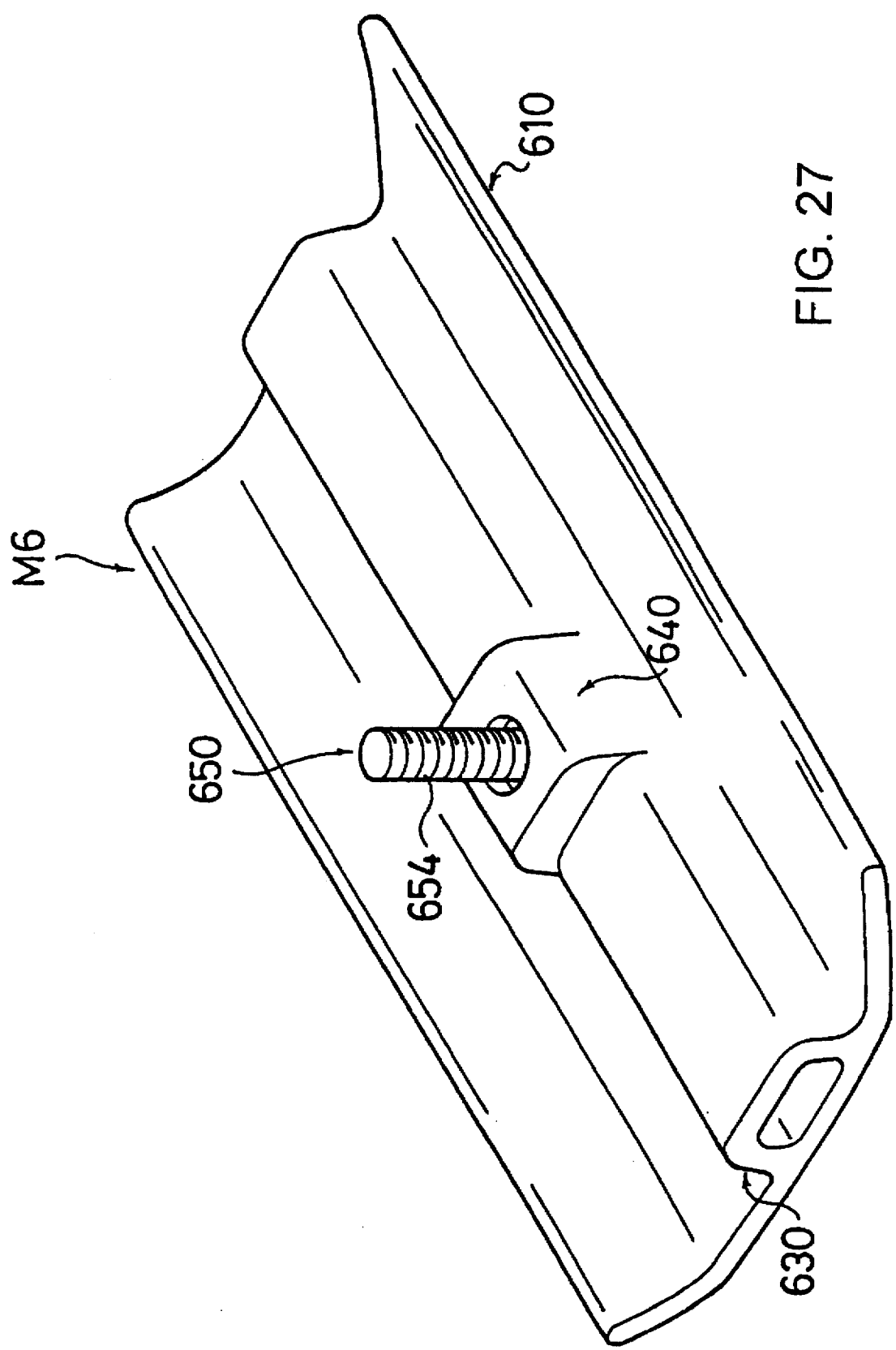
FIG. 27 is a perspective view showing a part of another embodiment of the side moulding according to the present invention.
Figure 28:
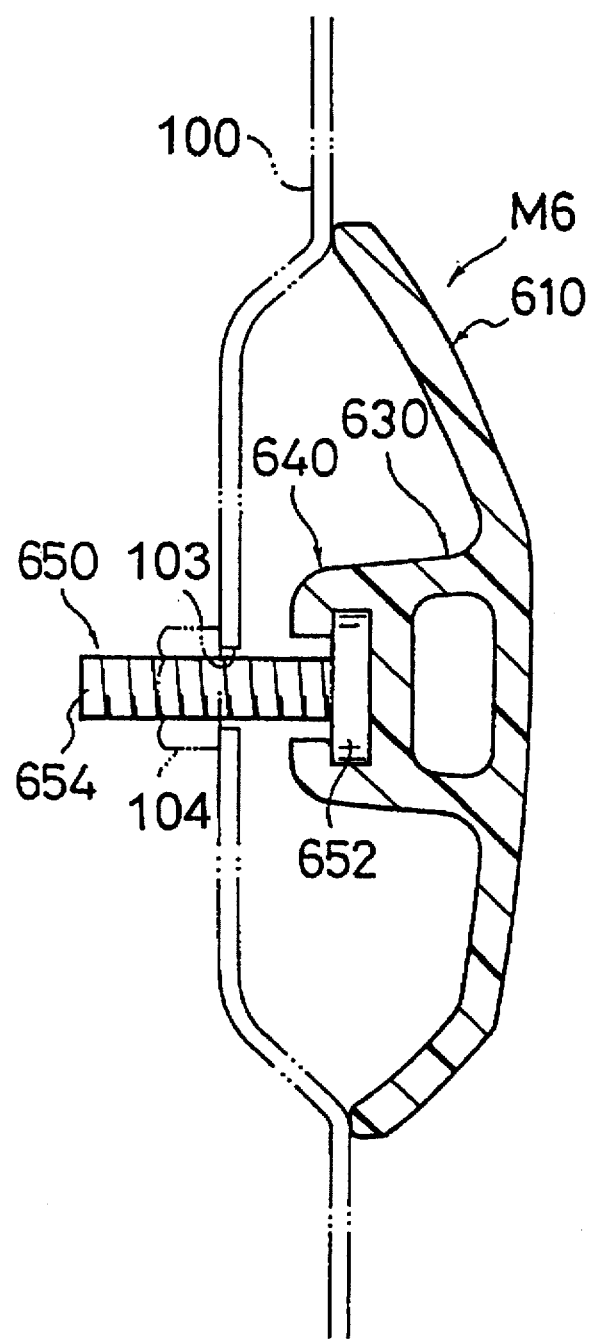
FIG. 28 is a sectional view of the side moulding of FIG. 27 including the bolt in cross section.

FIGS. 27 and 28 show a side moulding M6 of further another embodiment according to the present invention. Hereinafter only differences from the side moulding M5 of the above-described embodiment will be explained. The side moulding M6 has a seating body 652 of a bolt 650 embedded in a fastening section, i.e. a partly thick section 640, inside a hollow thick section 630, and is identical in other respects of constitution to the side moulding M5 described above. This bolt 650 is inserted into an insertion hole 103 of the body panel 100, engaging a nut 104 with an external screw section 654 in the body panel 100, to thereby attach a moulding body 610 to the automotive body.

Figure 29:
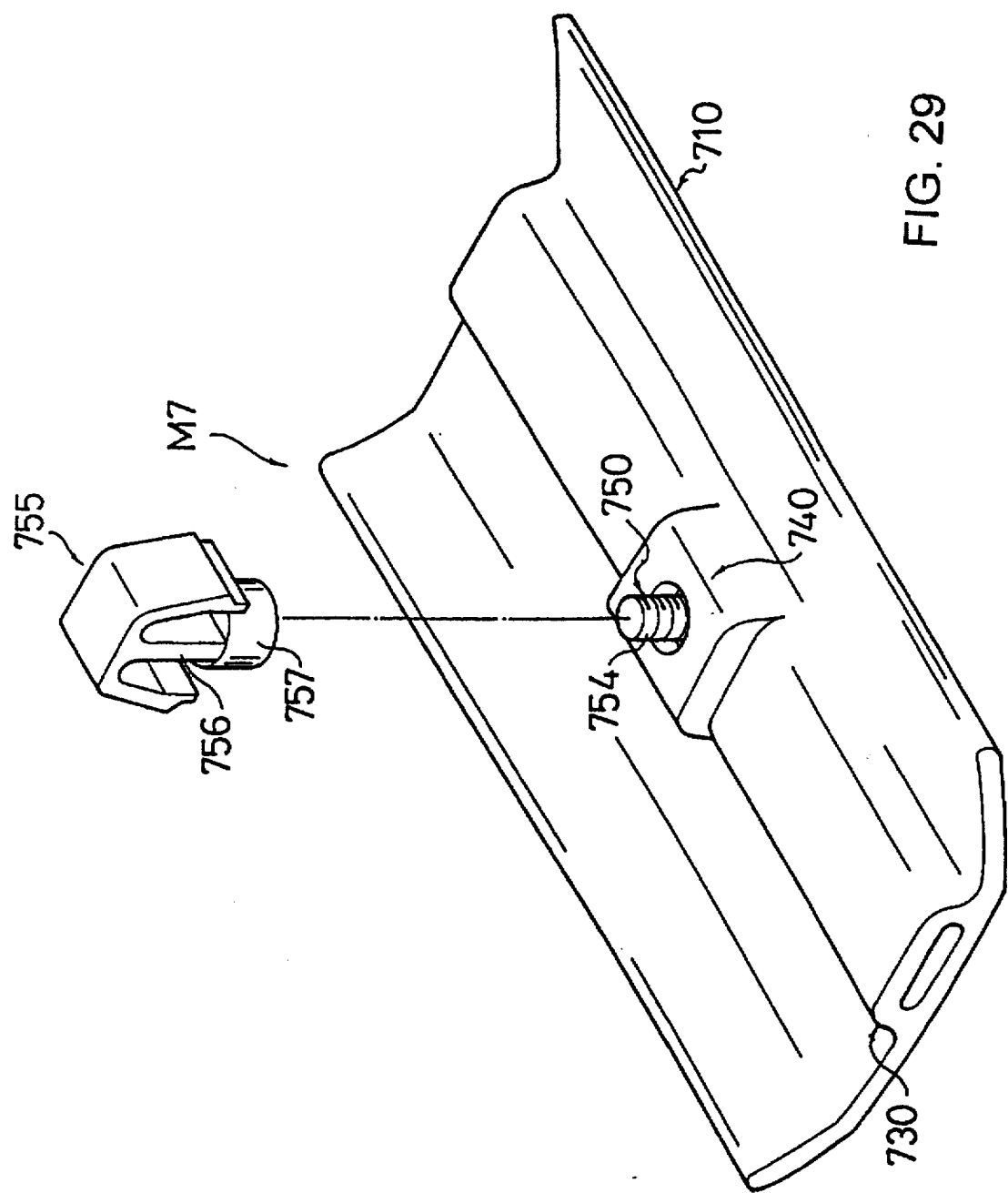
FIG. 29 is a perspective view showing a part of another embodiment of the side moulding according to the present invention.
Figure 30:
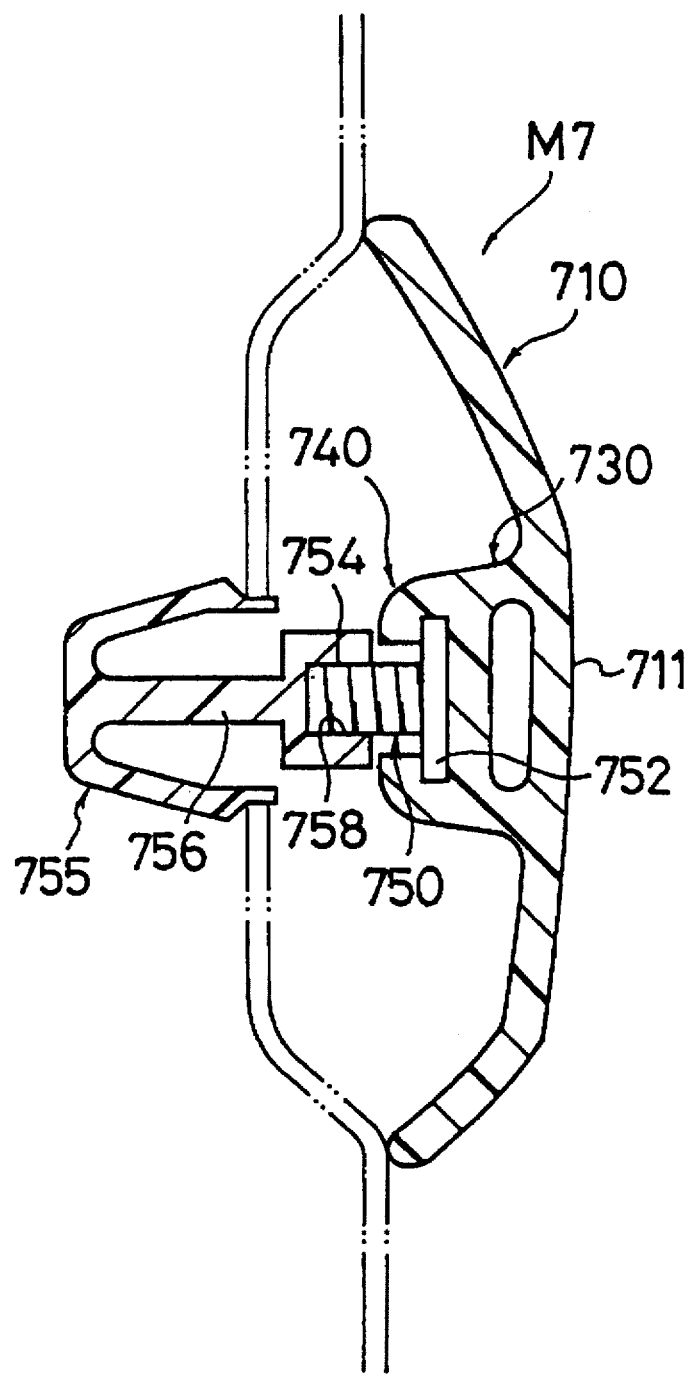
FIG. 30 is a sectional view of the side moulding of FIG. 29 including the bolt and clip holder in cross section.

FIGS. 29 and 30 show another embodiment of a side moulding M7 according to the present invention. At the central part in the direction of width inside a moulding body 710, a hollow thick section 730 which is a little flatter than the aforementioned hollow thick section 630 is moulded integrally along the longitudinal direction; inside the hollow thick section 730 a partly thick section 740 is integrally moulded; and in this partly thick section 740 is embedded a fastener, i.e. a seating body 752 of a bolt 750. A clip 755 is of such a constitution that a cylindrical section 757 is provided at the base end of a connecting section 756 and an internal screw section 758 is provided on the inner peripheral surface of this cylindrical section 757. With an external screw section 754 of the bolt 750 engaged with the internal screw section 758 of the cylindrical section 757 which is provided at the base end of the clip 755, the clip 755 is integrally installed to the moulding body 710 through the bolt 750.

In this side moulding M7 also, the hollow thick section 730 is provided inside the moulding body 710, and therefore there will hardly occur sink marks, waviness, surface irregularities, etc. in a part of the surface (decorative surface) 711 of the moulding body 710 where the bolt 750 is mounted, because of the presence of the hollow thick section 730, notwithstanding providing inside the hollow thick section 730 the partly thick section 740 for embedding the seating body 752 of the bolt 750.

Figure 31:
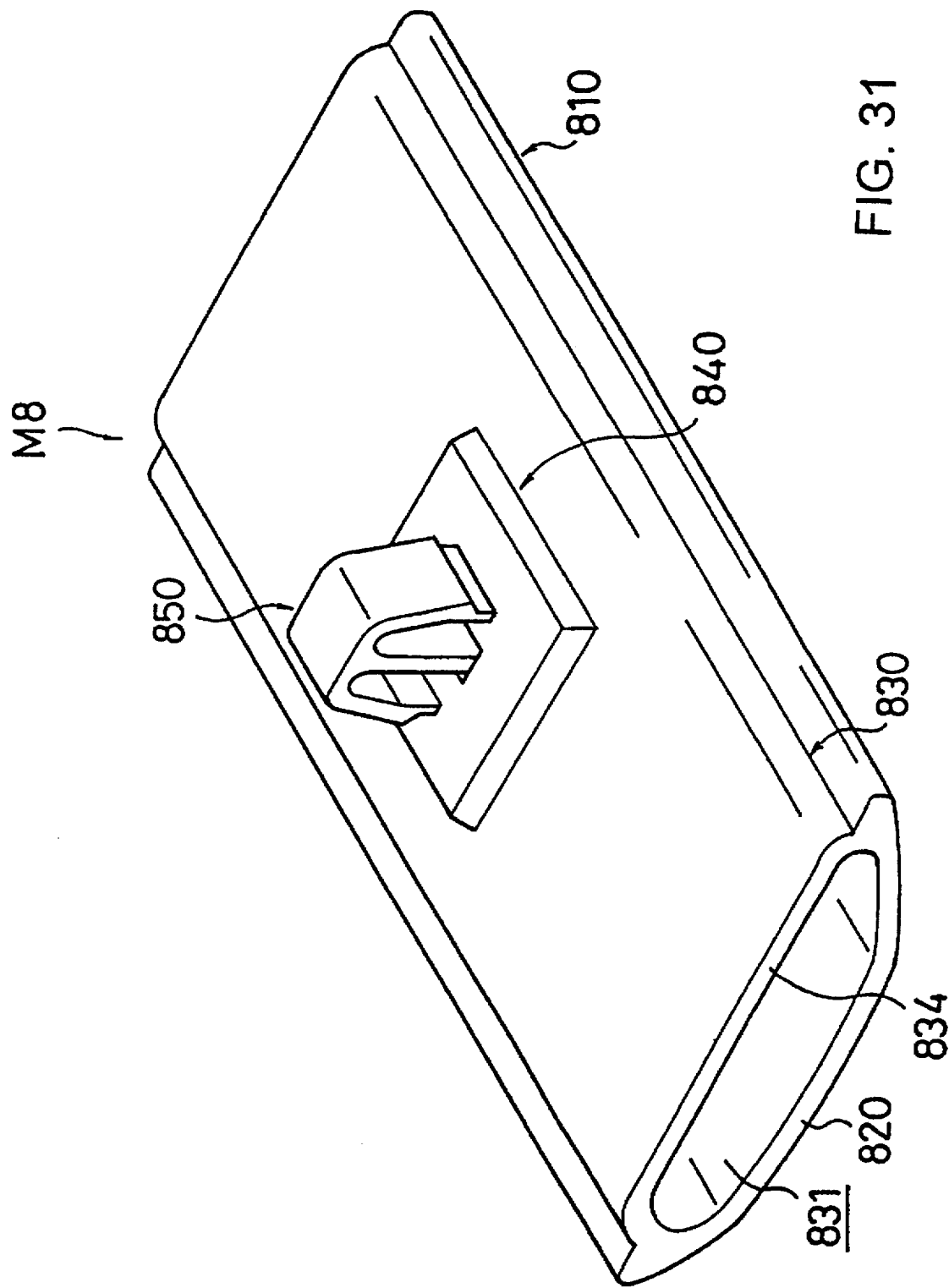
FIG. 31 is a perspective view showing a part of another embodiment of the side moulding according to the present invention.
Figure 32:
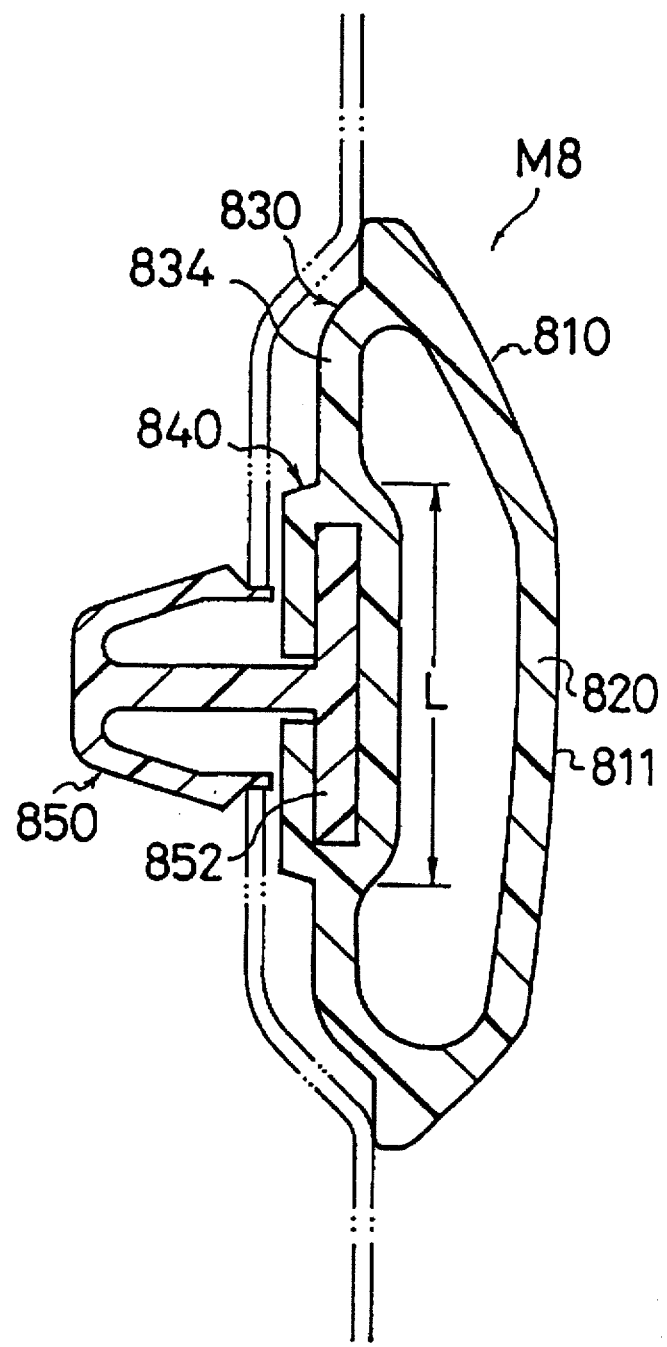
FIG. 32 is a sectional view of the side moulding of FIG. 26 including the clip holder in cross section.

FIGS. 31 and 32 show a side moulding M8 of further another embodiment of the present invention. A moulding body 810 has a decorative section 820, a hollow thick section 830 provided astride the decorative section 820, extending in a direction in which it goes away from the back side of the decorative section 820, and a partly thick section 840. The hollow thick section 830 consists of a back wall 834 and a part of the decorative section 820. The whole body of the moulding body 810 is moulded hollow, and is provided with a fastening section, that is, the partly thick section 840, at the center in the direction of width of the back wall 834. The fastener is a clip 850, which is integrally mounted to the moulding body 810 with a seating body 852 of the clip 850 embedded in the partly thick section 840.

The moulding body 810 is hollow through the entire length, and a large hollow section 831 is formed therein; there will, therefore, never occur sink marks, waviness, surface irregularities, etc. in the surface (decorative section) 811 of the moulding body 810 because the surface (decorative section) 811 of the moulding body 810 is substantially apart from the back wall 834 through the large hollow section 831, even when sink marks, waviness, surface irregularities, etc. exist on the hollow section 831 side of the partly thick section 840 by the presence of a difference in wall thickness. Furthermore, the side protective moulding has such an advantage that since the moulding body 810 is hollow throughout its length and can be increased in length (L) along the direction of width of the moulding body 810 at the partly thick section 840, the seating body 852 of the clip 850 can be made larger, thereby increasing the mounting strength of the clip 850 with respect to the moulding body 810.

Figure 33:
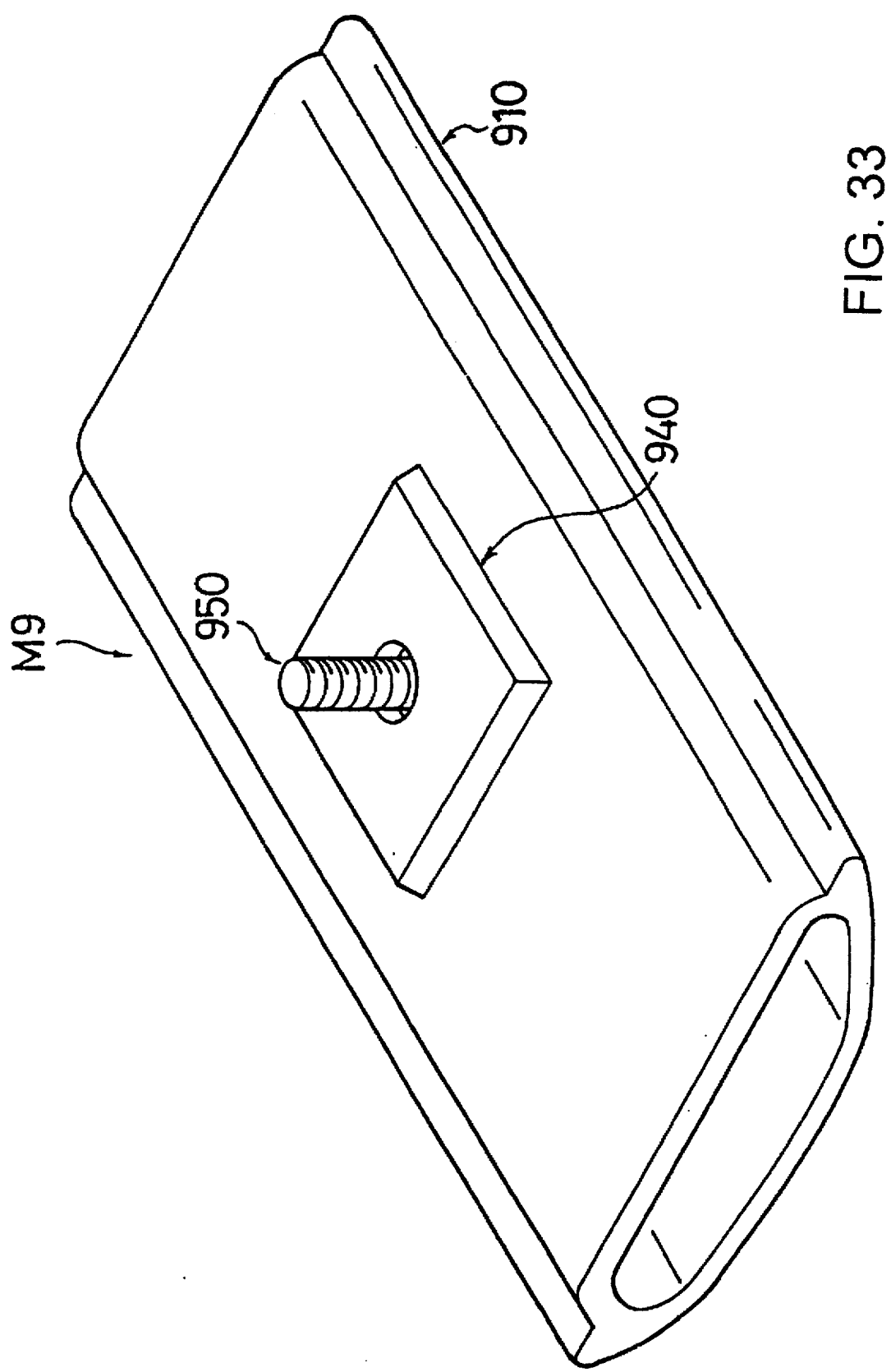
FIG. 33 is a perspective view showing a part of the last embodiment of the side moulding according to the present invention.
Figure 34:
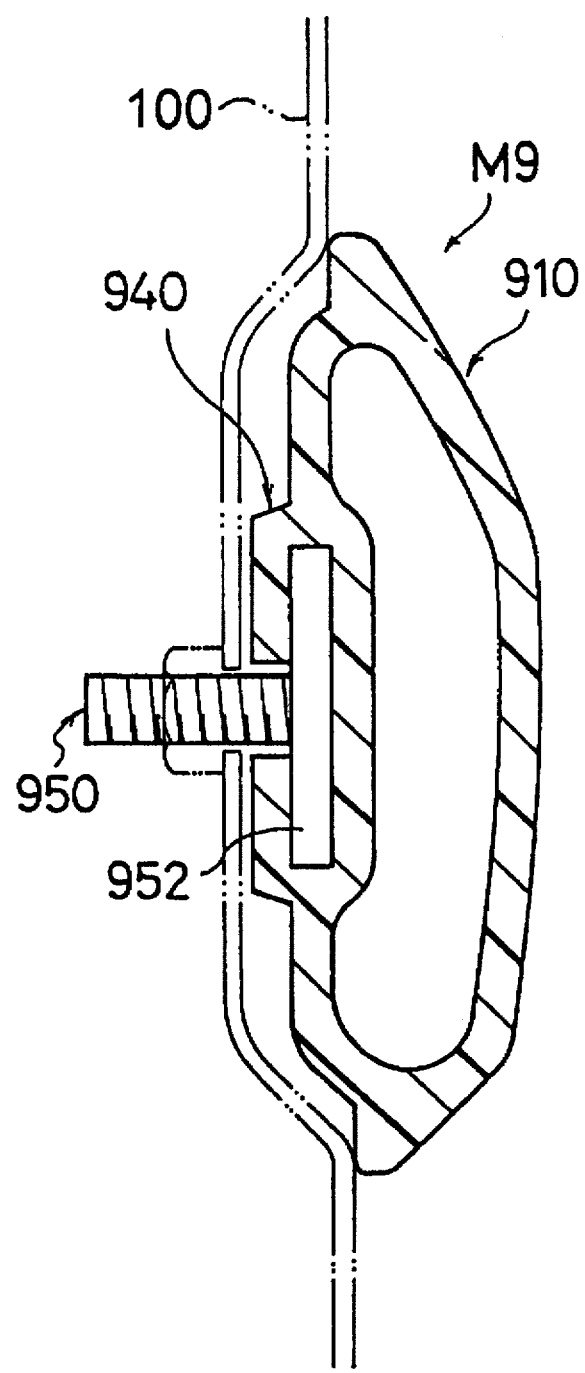
FIG. 34 is a sectional view of the side moulding of FIG. 33 including the bolt in cross section.

FIGS. 33 and 34 show a side moulding M9 of the last embodiment according to the present invention. The side mouldings M9 of the present embodiment differs from the side moulding M8 described above only in attaching members for attaching a moulding body 910 to the body panel 100 of the automotive body. That is, in the side moulding M9, a seating body 952 of a bolt 950 is embedded in a partly thick section 940 provided inside the moulding body 910 which is hollow through its entire length, and the bolt 950 is mounted as one body to the moulding body 910. Even this side moulding M9 can be increased in length (L) along the direction of width of the moulding body 910 in the partly thick section 940; it is, therefore, possible to use a larger-sized seating body 952 of the bolt 950 having a greater mounting strength in relation to the moulding body 910.

It should be noted that in the above-described embodiments, clips and bolts are used as fasteners for attaching the moulding body to the automotive body, but the present invention is not limited to these fasteners.

The side protective moulding for automobiles of the present invention has the following advantages.

The rib section extending from the back side of the protruding section toward the automotive body, being moulded hollow by the hollow injection moulding process, can withstand an external force if the side moulding accidentally contacts a wall, an adjacent motor vehicle, or other during travel, enabling to protect the automotive body from the side impact.

Figure 12:
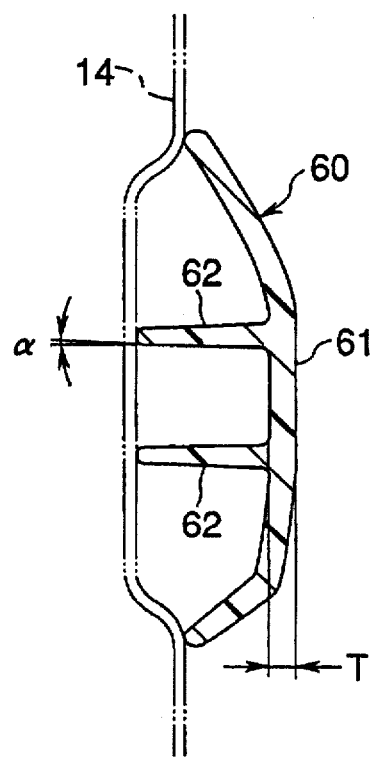
FIG. 12 is a sectional view taken in the direction of width of a prior art side moulding.
Figure 13:
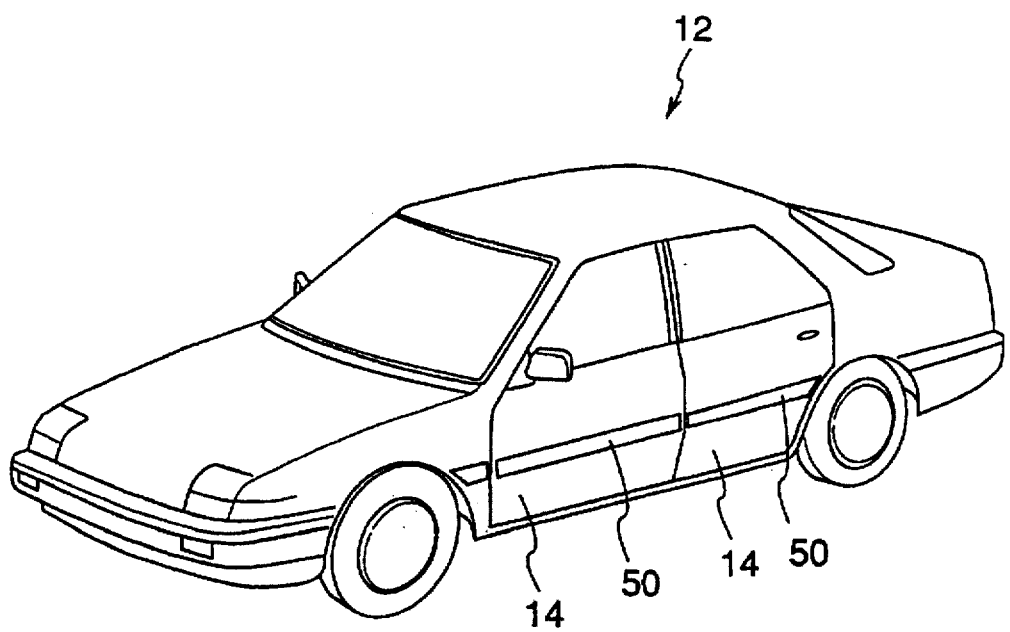
FIG. 13 is a perspective view of an automobile provided with the side mouldings.

Also the rib section, formed in a shape of box, is hard to deform as compared with a pair of prior art ribs shown in FIG. 12 if exposed to the oblique impact, thus positively protecting the automotive body.

Furthermore, since the rib section is moulded hollow by the hollow injection moulding process, light-weight side moulding can be manufactured at a low cost. And if the side moulding is increased in thickness in an attempt to provide a greater strength, no such defects as sink marks and wrinkles will occur in the surface of the decorative section. The side moulding, therefore, is able to satisfy a decorative function required to the side moulding.

Furthermore, forming a reinforcing leg section on the surface opposite to the body side surface of the rib section reinforces an area removed from the decorative section, thereby enabling to reinforce the side moulding without causing sink marks to appear in the surface of the decorative section.

Also the impact strength of the side moulding can be increased by setting the outside position of the reinforcing leg section in the direction of width within a range of about one-quarter or less of the width of the rib section from the edge in width direction of the rib section.

Furthermore, occurrence of sink marks in the surface of the decorative section can be prevented by setting the height of the rib section in the direction of body within a range of about one-third to three times as large as the width of the rib section and within a range of about 4 mm to 15 mm.

Furthermore, it is possible to increase the impact strength of the side moulding by setting the width of the rib section within about one-eighth to one-half of the width of the decorative section, and within about 5 mm to 18 mm.

Furthermore, the embodiments of the present invention shown in FIGS. 14 and after have the following advantages.

The longitudinal side wall of the hollow thick section, being aligned with that of the fastening section, withstands the bending force exerted to the decorative section and at the same time the longitudinal side wall of the fastening section withstands the bending force acting on the fastener in cooperation with the longitudinal side wall of the hollow thick section.

The provision of the reinforcing ribs apart from the decorative section, as one body with the fastening section, between adjacent fastening sections can improve the strength of the moulding body without causing such a defect as sink marks in the decorative section, and at the same time, can improve the strength of the fastening section against the moment in the longitudinal direction.

In the state that the longitudinal side wall of the hollow thick section is aligned with that of the fastening section, the longitudinal side wall of the hollow thick section withstands the bending force in the decorative section, while the longitudinal side wall of the fastening section in cooperation with the longitudinal side wall of the hollow thick section Withstands the bending force acting on the fastener.

By providing the decorative section with a hollow thick section formed by swelling from the back side, and also the hollow thick section with a fastening section by separating from the decorative section, there will never occur such defects as sink marks, waviness, surface irregularities, etc. in the decorative section if the relatively thick fastening section is cooled at a slow rate. Therefore it is possible to freely design its shape in order to improve the mounting strength of the fastening section. Consequently, it is possible to satisfy both mutually contradictory requirements for maintaining the external appearance of the decorative section and for improving the strength of the fastening section.

Furthermore, since the longitudinal side wall of the hollow thick section and the longitudinal side wall of the fastening section are aligned, the longitudinal side wall of the hollow thick section withstands the bending force exerted to the decorative section, and at the same time the longitudinal side wall of the fastening section in cooperation with the longitudinal side wall of the hollow thick section withstands the bending force acting on the fastener.

Providing reinforcing ribs, integrally with the fastening sections, between adjacent fastening sections apart from the aforesaid decorative section can improve the strength of the moulding body without producing any such a symptom as sink marks in the decorative section, and also can improve the strength of the fastening section against the moment in the longitudinal direction.

A back wall extended in the direction of width also can improve the mounting strength of the fastening section.

What is claimed is:

1. A side protective moulding to be attached on the side surface of an automobile body, said side protective moulding comprising: an elongated decorative section having a front side, a back side, a top edge and a bottom edge, and including a protruding section and means for maintaining said protruding section in spaced relationship to the side surface of an automobile body with said back side facing said side surface of the automobile body, said decorative section also including a curved section arranged to extend obliquely toward said side surface of an automobile body from said protruding section; and a rib section, molded as a unit with the decorative section and being in the form of an elongated, hollow, tubular rib having a continuous molded perimeter, said rib extending along, and being directly connected to, the back side of said decorative section, with its direction of elongation parallel to the direction of elongation of the decorative section, the height of the rib section being less than the distance between the top and bottom edges of the decorative section, and at least part of the elongated decorative section.

2. A side protective moulding as claimed in claim 1, wherein said rib section has a reinforcing leg section protruding in a longitudinal direction of said rib section on a surface opposite to the side surface of said body.

3. A side protective moulding as claimed in claim 2, wherein the outer position in the direction of width of said reinforcing leg section is set within a range of about a quarter or less of the width of said rib section from the edge in the direction of width of said rib section.

4. A side protective moulding as claimed in claim 1, wherein the height of said rib section in the direction of said body is set within a range of about one-third to three times as large as the width of said rib section, and within a range of about 4 mm to 15 mm.

5. A side protective moulding as claimed in claim 2, wherein the height of said rib section in the direction of said body is set within a range of about one-third to three times as large as the width of said rib section, and within a range of about 4 mm to 15 mm.

6. A side protective moulding as claimed in claim 3, wherein the height of said rib section in the direction of said body is set within a range of about one-third to three times as large as the width of said rib section, and within a range of about 4 mm to 15 mm.

7. A side protective moulding as claimed in claim 1, wherein the width of said rib section is set within a range of about one-eighth to one-half as large as the width of said decorative section, and within a range of about 5 mm to 18 mm.

8. A side protective moulding as claimed in claim 2, wherein the width of said rib section is set within a range of about one-eighth to one-half as large as the width of said decorative section, and within a range of about 5 mm to 18 mm.

9. A side protective moulding as claimed in claim 3, wherein the width of said rib section is wet within a range of about one-eighth to one-half as large as the width of said decorative section, and within a range of about 5 mm to 18 mm.

10. A side protective moulding as claimed in claim 4, wherein the width of said rib section is set within a range of about one-eighth to one-half as large as the width of said decorative section, and within a range of about 5 mm to 18 mm.

11. A side protective moulding for automobiles including an assembly of an elongated moulding body having a decorative section with a front side, a back side, a top edge and a bottom edge, a fastening section, means on said fastening section for receiving fasteners for connection of the fastening section to the side surface of an automobile body, and a hollow thick section on the back side of said decorative section, said fastening section being provided in said hollow thick section, apart from said decorative section, the height of the hollow thick section being less than the distance between the top and bottom edges of the decorative section.

12. A side protective moulding for automobiles as claimed in claim 11, wherein said hollow thick section is formed of a pair of longitudinal side walls extending in a direction in which they go away from the back side of said decorative section, and a top-face wall mutually connecting the forward ends of said longitudinal side walls; and said fastening section extends in a direction in which it goes away from said top-face wall and has longitudinal side walls which are aligned with said longitudinal side walls of said hollow thick section.

13. A side protective moulding for automobiles as claimed in claim 11, wherein a reinforcing rib is provided integrally with said fastening section, between adjacent fastening sections, apart from said decorative section.

14. A side protective moulding for automobiles as claimed in claim 12, wherein a reinforcing rib is provided integrally with said fastening section, between adjacent fastening sections, apart from said decorative section.

15. A side protective moulding for automobiles as claimed in claim 11, wherein said decorative section is C-shaped; said hollow thick section is formed of a longitudinal side wall extending in a direction in which it goes away from the back side of said decorative section, and a back wall extending in a direction in which it goes away from the back side of said decorative section and is connected with the forward end of said longitudinal side wall; and said fastening section has a longitudinal side wall extending in a direction in which it goes away from said back wall and being aligned with said longitudinal side wall of said hollow thick section.

16. A side protective moulding for automobiles including an assembly of an elongated moulding body having a decorative section with a front side, a back side, a top edge and a bottom edge, a fastening section, and means comprising at least one fastener, molded integrally with said fastening section, for connection of the fastening section to the side surface of an automobile body, and a hollow thick section on the back side of said decorative section, said fastening section being provided in said hollow thick section, apart from said decorative section, the height of the hollow thick section, measured in a direction parallel to the direction from the top and bottom edges of the decorative section, being less than the distance between the top and bottom edges of the decorative section.

17. A side protective moulding for automobiles as claimed in claim 16, wherein said hollow thick section is formed of a pair of longitudinal side walls extending in a direction in which they go apart from the back side of said decorative section, and a top-face wall mutually connecting the forward ends of said longitudinal side walls; and said fastening section extends in a direction in which it goes away from said top-face wall and has longitudinal side walls which are aligned with said longitudinal side walls of said hollow thick section.

18. A side protective moulding for automobiles as claimed in claim 16, wherein a reinforcing rib is provided integrally with said fastening section, between adjacent fastening sections, apart from said decorative section.

19. A side protective moulding for automobiles as claimed in claim 17, wherein a reinforcing rib is provided integrally with said fastening section, between adjacent fastening sections, apart from said decorative section.

20. A side protective moulding for automobiles as claimed in claim 17, wherein said decorative section is C-shaped, and said hollow thick section is formed of a back wall extending in a direction in which it goes away from the back side of said decorative section.

21. A side protective moulding according to claim 1 in which said rib section is formed by hollow injection molding, whereby the decorative section is substantially free of external surface irregularities.

22. A side protective moulding for automobiles as claimed in claim 11, in which the hollow, thick section is formed by hollow injection moulding.

23. A side protective moulding for automobiles as claimed in claim 16, in which the hollow, thick section is formed by hollow injection moulding.

* * * * *

UNITED STATES PATENT AND TRADEMARK OFFICE
CERTIFICATE OF CORRECTION

PATENT NO. : 5,639,522
DATED : June 17, 1997
INVENTOR(S) : Renji Maki et al.

It is certified that error appears in the above-identified patent and that said Letters Patent is hereby corrected as shown below:

At page 1, in the name of the Assignee, after "Aichi-ken, Japan" add -- Honda Giken Kogyo Kabushiki Kaisha, Tokyo, Japan --

Signed and Sealed this

Twenty-eighth Day of October, 1997

Attest:

BRUCE LEHMAN

*Attesting Officer*   *Commissioner of Patents and Trademarks*